(12) United States Patent
Zimmermann et al.

(10) Patent No.: US 11,093,963 B2
(45) Date of Patent: Aug. 17, 2021

(54) SYSTEM FOR DIGITAL BONUS POINT MANAGEMENT

(71) Applicant: Sony Corporation, Tokyo (JP)

(72) Inventors: Klaus Zimmermann, Neckartenzlingen (DE); Aurel Bordewieck, Kirchheim unter Teck (DE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/531,143

(22) Filed: Aug. 5, 2019

(65) Prior Publication Data

US 2019/0355007 A1 Nov. 21, 2019

Related U.S. Application Data

(63) Continuation of application No. 14/173,203, filed on Feb. 5, 2014, now Pat. No. 10,387,907.

(30) Foreign Application Priority Data

Mar. 11, 2013 (EP) .................................. 13001207

(51) Int. Cl.
*G06Q 30/00* (2012.01)
*G06Q 30/02* (2012.01)
(52) U.S. Cl.
CPC ............................... *G06Q 30/0231* (2013.01)
(58) Field of Classification Search
CPC .............................................. G06Q 30/0231
See application file for complete search history.

(56) References Cited

U.S. PATENT DOCUMENTS

| 7,606,730 | B2 | 10/2009 | Antonucci |
| 7,769,630 | B2 | 8/2010 | Postrel |
| 9,202,229 | B2 | 12/2015 | Junger |
| 2007/0043594 | A1 | 2/2007 | Lavergne |
| 2007/0170251 | A1 | 7/2007 | Elias |
| 2008/0208688 | A1 | 8/2008 | Byerley et al. |
| 2009/0018961 | A1 | 1/2009 | Seven |
| 2009/0048916 | A1 | 2/2009 | Nuzum et al. |
| 2010/0082444 | A1 | 4/2010 | Lin et al. |
| 2011/0093318 | A1* | 4/2011 | Guday ............... G06Q 30/0236 705/14.13 |
| 2012/0016731 | A1 | 1/2012 | Smith et al. |
| 2012/0310715 | A1* | 12/2012 | Singhal .............. G06Q 30/0267 705/14.1 |
| 2012/0323710 | A1 | 12/2012 | Luke |

(Continued)

OTHER PUBLICATIONS

Office Action dated Feb. 28, 2020 in India Patent Application No. 335/DEL/2014, 8 pages.

*Primary Examiner* — Scott C Anderson
(74) *Attorney, Agent, or Firm* — Xsensus LLP

(57) ABSTRACT

A system for managing an account includes a tag element representing a value, a mobile device adapted to determine the value when being located in proximity of the tag element, and adapted to access a network, and a server adapted to communicate with the mobile device via the network and adapted to access to a database, the database being adapted to store the account, the account being related to the mobile device (102) and to the tag element; wherein the mobile device is further adapted to communicate the determined value to the server, and wherein the server is further adapted to add the communicated value to the account.

6 Claims, 17 Drawing Sheets

(56) References Cited

U.S. PATENT DOCUMENTS

| | | | |
|---|---|---|---|
| 2013/0013499 A1* | 1/2013 | Kalgi | G06Q 20/34 |
| | | | 705/41 |
| 2013/0046605 A1* | 2/2013 | Baron | G06Q 30/0605 |
| | | | 705/14.27 |
| 2013/0103484 A1* | 4/2013 | McLaughlin | G06Q 30/0226 |
| | | | 705/14.33 |
| 2013/0144703 A1* | 6/2013 | VanNoller | G06Q 20/208 |
| | | | 705/14.26 |
| 2013/0173370 A1 | 7/2013 | Schory et al. | |

* cited by examiner

SYSTEM FOR DIGITAL BONUS POINT MANAGEMENT

CROSS-REFERENCE TO RELATED APPLICATIONS

This application is a continuation of U.S. application Ser. No. 14/173,203, filed Feb. 5, 2014, and claims priority to EP 13001207.3, filed Mar. 11, 2013, the entire contents of each are incorporated herein by reference.

BACKGROUND

Field of the Disclosure

An embodiment of the disclosure relates to a system for managing an account, e.g. an account for collecting, managing, sharing and trading digital bonus points for customer loyalty.

Further embodiments of the disclosure relate to a server, a mobile device, a method, a computer program and a non-transitory computer-readable medium for managing an account.

Description of Related Art

The "background" description provided herein is for the purpose of generally presenting the context of the disclosure. Work of the presently named inventors, to the extent it is described in the background section as well as aspects of the description which may not otherwise qualify as prior art at the time of filing, are neither expressly nor impliedly admitted as prior art against the present disclosure.

Bonus cards are increasingly used by merchants and service providers for rewarding and enhancing customer loyalty. For example, a specific customers turnover or number of purchased products may be noted on a bonus card and may e.g. be rewarded by a corresponding number of bonus points. When a predetermined number of bonus points is reached by the customer, the bonus points may be used for achieving some sort of bonus, such as a product for free, a sales discount, a preferred customer status or the like.

Known systems for rewarding customer loyalty inhere, however, some drawbacks. For example, customers desiring to participate to multiple loyalty programs typically must carry a considerable number of bonus cards with them. Keeping track of these cards can be challenging. Further, recording of bonus points at each purchase can be time consuming and inconvenient for both, the merchant and the customer.

Thus, there is a need for a system and method for conveniently collecting and managing bonus points, enhancing the benefit for both, the customers and the merchants.

This object is solved by a system, a server, a mobile device, a method, a computer program and a non-transitory computer-readable medium according to the independent claims.

SUMMARY

A system for managing an account includes a tag element representing a value, a mobile device adapted to determine the value when being located in proximity of the tag element, and adapted to access a network, a server adapted to communicate with the mobile device via the network and adapted to access to a database, the database being adapted to store the account; the account being related to the mobile device and to the tag element; wherein the mobile device is further adapted to communicate the determined value to the server, and wherein the server is further adapted to add the communicated value to the account.

A server for use in a system for managing an account includes a network interface adapted to communicate over a network with a mobile device related to the account; a database access interface adapted to provide access to a database in which the account is stored; and a processor adapted to receive, from the mobile device and via the communication interface, a value represented by a tag element, to generate a request for adding the value to the account, and to transmit the request to the database via the database access interface.

A mobile device for use in a system for managing an account, the mobile device including a tag reader adapted to receive, when being located in proximity of a tag element, a data signal representing a value of the tag element; a communication interface adapted to communicate with a server; a processor adapted to determine the value based on the data signal and to communicate the determined value via the communication interface to the server.

A method for managing an account includes determining, using a tag reader of a mobile device, a value represented by a tag element located in proximity of the tag reader; transmitting the determined value from the mobile device to a server; and adding, in a database accessible by the server, the determined value to the account; the account being related to the mobile device and to the tag element.

A computer program includes computer program instructions which, when executed by a computer, cause the computer to perform a method, the method comprising determining, using a tag reader of a mobile device, a value represented by a tag element located in proximity of the tag reader, transmitting the determined value from the mobile device to a server, and adding, in a database accessible by the server, the determined value to the account, the account being related to the mobile device and to the tag element.

A non-transitory computer-readable medium includes the computer program as described in the above.

A further system for managing an account includes a tag element representing a value and including tag identification data identifying a provider of the tag, a mobile device adapted to determine the value and the tag identification data when being located in a proximity of the tag element, and adapted to access a network, and a server adapted to communicate with the mobile device via the network and adapted to access a database in which the account is stored; wherein the mobile device is further adapted to communicate to the server the determined value together with the tag identification data and together with device identification data identifying the mobile device, and wherein the server is further adapted to determine the account based on the tag identification data and on the device identification data and to add the communicated value to the account.

The foregoing paragraphs have been provided by general introduction, and are not intended to limit the scope of the following claims. The described embodiments, together with the further advantages, will be best understood by reference to the following detailed description taken in conjunction with the accompanying drawings. The elements of the drawings are not necessarily to scale relative to each other.

BRIEF DESCRIPTION OF THE DRAWINGS

A more concrete appreciation of the disclosure and of many of the intended advantages thereof will be readily obtained as the same becomes better understood by reference to the following detailed description when considered in connection with the accompanying drawing, wherein.

DESCRIPTION OF THE EMBODIMENTS

Figure 1:
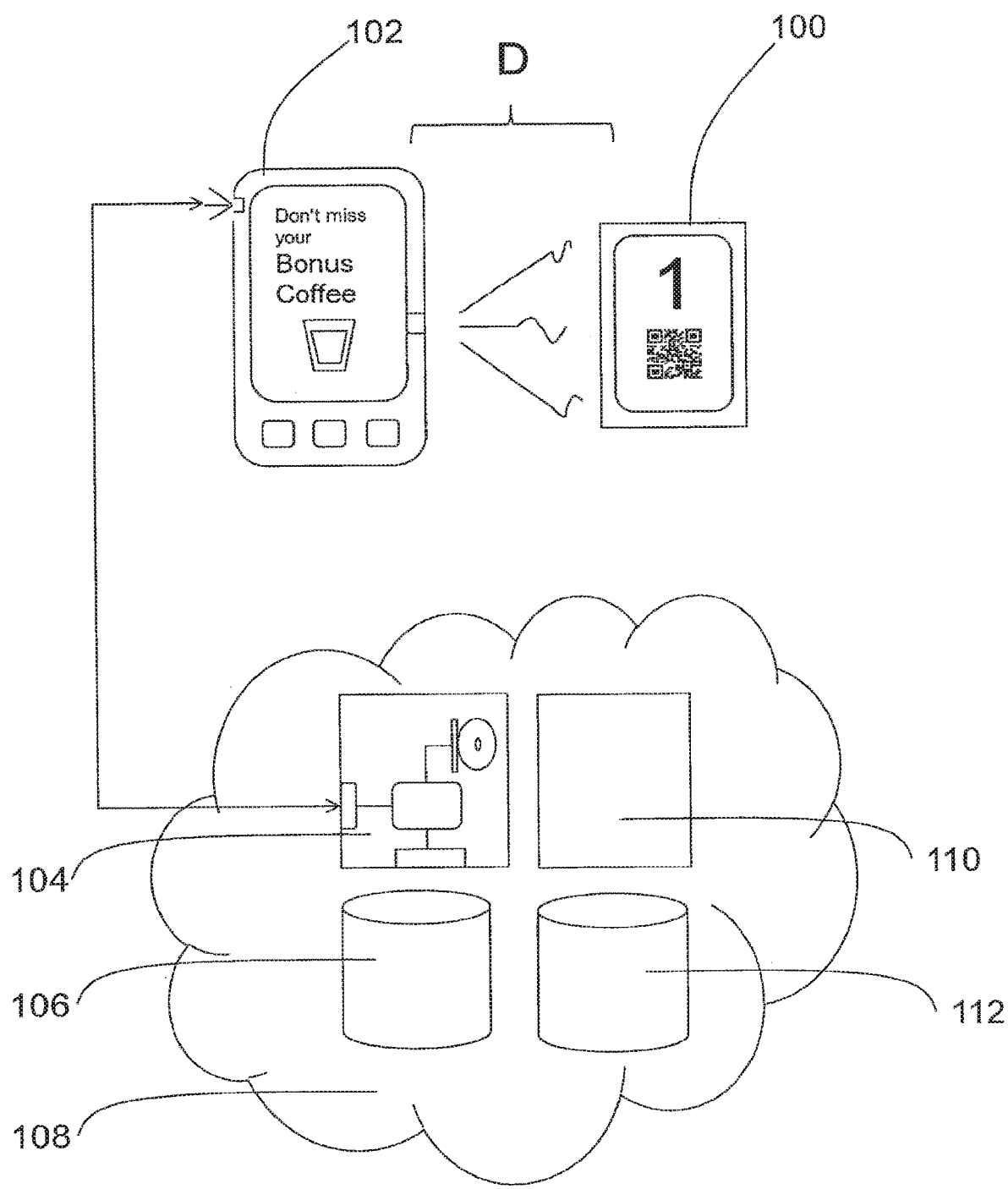
FIG. 1 illustrates an embodiment of a system for managing an account, e.g. for collecting, managing, sharing and trading bonus points.

Referring now to the drawings, wherein like reference numerals designate identical or corresponding parts throughout the several views, FIG. 1 illustrates an embodiment of a system for managing an account e.g. for digital bonus point collection.

The system includes a tag element 100 representing a value, e.g. a natural number representing a number of bonus points, a number of purchased items and/or a number corresponding to a generated revenue. For example, the tag element may represent one bonus point e.g. as a reward for purchasing a single item, such as a coffee at a coffee shop.

The system further includes a mobile device 102 adapted to determine the value represented by the tag element 100. Mobile device 102 may for example be adapted to determine the value when being located in proximity, e.g. a close vicinity, of tag element 100. For example, if a distance between tag element 100 and mobile device 102 is smaller than a predetermined distance threshold D of e.g. 4 or 5 cm, mobile device 102 may be adapted to determine the value represented by tag element 100, e.g. by some sort of evaluation of or communication with tag element 100, as will be described in more detail below.

Mobile device 102 may further be adapted to access a network, and to access, via the network, a server 104, which server 104 is also adapted to communicate with mobile device 102 via the network. The network may be any kind of communication network, e.g. a mobile (tele-)communications network, a wireless network and/or the internet.

Server 104 may further be adapted to access a database 106, which database 106 may be adapted to store the account. The account may be any kind of digitally stored account, e.g. an account for collecting and managing digital bonus points. The account may further be related to mobile device 102 and to tag element 100.

In particular, the account may be an account corresponding to a "virtual bonus card", i.e. an account of e.g. specific customer for collecting bonus points of e.g. a specific merchant. Thus, the term account, if not specifically noted otherwise, is used herein within the sense of a virtual bonus card of a specific customer for collecting bonus points of a specific merchant.

Another type of account may be a "customer account" for the bonus program, which may be created upon enrolment of the customer to the bonus program, and which may comprise and/or be linked to a plurality of "virtual bonus cards" of the customer, each of which may be used for collecting bonus points of a different merchant.

A further type of an account may be a "merchant account" for specifying merchant-specific information within the platform, such as the merchant's opening hours. Further, merchants can specify the settings of the bonus program to be offered to their customers within the "merchant account", including the design of a corresponding virtual bonus card. Still further, merchants may use their account for checking statistical evaluations of their bonus programs.

For example, it may be possible to identify the account (virtual bonus card) as a personal account of a user of mobile device 102 for collecting bonus points issued by a merchant presenting tag element 100. The account may for example be identified by means of any kind of identification number of e.g. mobile device 102 on the one hand and tag element 100 on the other hand.

It is also possible to identify the merchant based on a selection of the user at mobile device 102. For example, the user may start an application, the application being specific to the merchant or allowing a selection of the merchant. For example, the application may show the customers virtual bonus card specific to the merchant.

The user may also be identified by providing personal identification data, such as a user identification number and a password to the application. Thus, user identification data and merchant identification data may be used for identifying the account.

Upon determination of the value represented by tag element 100, the mobile device may be adapted to communicate the determined value represented by tag element 100 to server 104. Server 104 may be adapted to add the communicated value to the account. Thus, bonus points presented by tag element 100 to the user of mobile device 102 may be collected, e.g. stored within the account.

Server 104 may form part of a cloud computing environment 108 that will be further described below. Cloud computing environment may include further servers 110 and databases 112 accessible through the network.

In a further embodiment of a system for managing an account, tag element 100 may represent a value and may include tag identification data identifying a merchant providing tag element 100. Mobile device 102 may be adapted to determine the value and the tag identification data when being located in proximity of tag element 100, and may be adapted to access the network. Server 104 may be adapted to communicate with mobile device 102 via the network, and may be adapted to access the database in which the account is stored. Mobile device 102 may further be adapted to communicate to the server the determined value together with the tag identification data and together with device identification data identifying the mobile device. Server 104 may further be adapted to determine the account based on the tag identification data and on the device identification data and to add the communicated value to the account. Thus, in this embodiment, the account (i.e. virtual bonus card) depends on the tag identification (i.e. on the merchant providing tag element 100) and on the device identification data (i.e. on the customer owning mobile device 102).

Thus, the systems as described in the above may be used for realizing a bonus program for promoting customer loyalty. When taking part in the bonus program, customers may receive and aggregate some sort of bonus points which may be managed and accumulated in the account, i.e. in the respective virtual bonus card stored in the user account. The number of bonus points received may depend on a number of purchased products and/or on a generated turnover at the merchant's. With a predetermined number of bonus points accumulated at the account, customers can exchange them into some kind of (typically monetary) benefit.

For realizing a bonus program within the system of FIG. 1, it may be assumed that tag element 100 has been handed over to the merchant by a provider of the bonus program. The value represented by the tag element may correspond to a number of bonus points, e.g. to one bonus point in the example depicted in FIG. 1.

Mobile device 102 may be a personal device of a customer of the merchant, and may have been previously registered for the bonus program, e.g. by accessing server 104 via the network for enrolling in the bonus program. During the enrolment procedure, mobile device 102 may have received the device identification number e.g. uniquely identifying mobile device 102, and the application data.

At a visit to the merchant's, the owner of mobile device 102 may have e.g. upon check-out the opportunity to approach mobile device 102 to tag element 100 for collecting bonus points corresponding to the value, e.g. as a reward for his loyalty and purchases. Since being adapted to determine the value, mobile device 102 may recognize the bonus points and communicate the determined value to server 104, For example, mobile device 102 may send a message to server 104, the message including the value, and further optionally the tag identification data identifying the provider of the tag and thereby the merchant, and further optionally the device identification data identifying the mobile device and thereby the customer. Alternatively or in addition, the customer may also be identified by a user identification and e.g. a password, which may also be included in the message. The message may include a request to server 104 for adding the value to the respective account, i.e. for accumulating the additionally earned bonus points to the customer's account within the bonus program of the merchant.

It should be noted that within this embodiment of the system, only the communication infrastructure (network interface) of the customer's mobile device 102 is used, and that thus, no communication infrastructure must be provided at the merchant's site for communicating the bonus points. Thus, from a merchant's perspective, the proposed solution represents a fast, easy to implement and convenient solution to offer a bonus program. This makes the proposed solution particularly interesting for small merchants with little infrastructure at their counters, such as coffee shops, bakeries, restaurants, drive-in snack bars, laundries or the like.

The merchant further does not need to provide traditional paper bonus cards or electronic bonus cards, which results in a cost and environmental benefit.

Security against manipulation may be increased, e.g. when realizing the application as a secure container.

Further, as soon as contactless electronic payment methods become more popular, the bonus program can be coupled to any contactless payment system, allowing payment and earning bonus points within a single step.

From a point of view of the customers, the solution is highly convenient, since the digitally recorded bonus points can be easily evaluated and managed within the database.

The customers do not have to carry along numerous different bonus cards anymore. Contrasting to this, the bonus programs at which they wish to participate may be accessed via a single application running on a mobile device, e.g. their personal smart phone, which they would carry along with them anyway.

By means of their mobile device, the customers are in persistent control of all the bonus programs and never miss any bonus points, since having access to any desired bonus program via their mobile device at any time.

Further, the customers also benefit from the time savings achieved by the proposed, digital solution based on mobile communication. The recording and management of the bonus points is almost entirely under the customers control.

In a further embodiment of the system depicted in FIG. 1, tag element 100 may be any device or object adapted to represent the value. For example, tag element 100 may include an electronic storage for digitally storing the value, and an electronic communication means for electronically communicating the value e.g. to mobile device 102. Communication between tag element 100 and mobile device 102 may take place via any electronic communication means and protocol, e.g. by using radio communication or near field communication when both, tag element 100 and mobile device 102, are located in close proximity, e.g. in close vicinity or nearby each other. For example, communication may take place if both devices are placed nearby each other, e.g. within a distance smaller than predetermined distance threshold D of 5 or 10 cm.

In an embodiment, the value of tag element 100 may be determinable by mobile device 102 through radio frequency communication, e.g. within a range of 4 cm or less around tag element 100. Alternatively or in addition, tag element 100 may be a near field communication (NFC) element adapted to communicate according to a NFC standard.

Alternatively or in addition, tag element 100 may include a machine-readable representation of the value, realized e.g. by a bar code or by a QR Code™ adapted for being scanned or photographed by mobile device 102 for determining the value at mobile device 102.

Tag element 100 may further include an optical representation of the value, e.g. an optical or graphical representation of the value printed on tag element 100. The optical or graphical representation may be adapted to be recognized by optical character recognition techniques and may be readable for a human, e.g. the merchant storing tag element 100 near his checkout desk, thus controlling distribution of bonus points.

Figure 2:
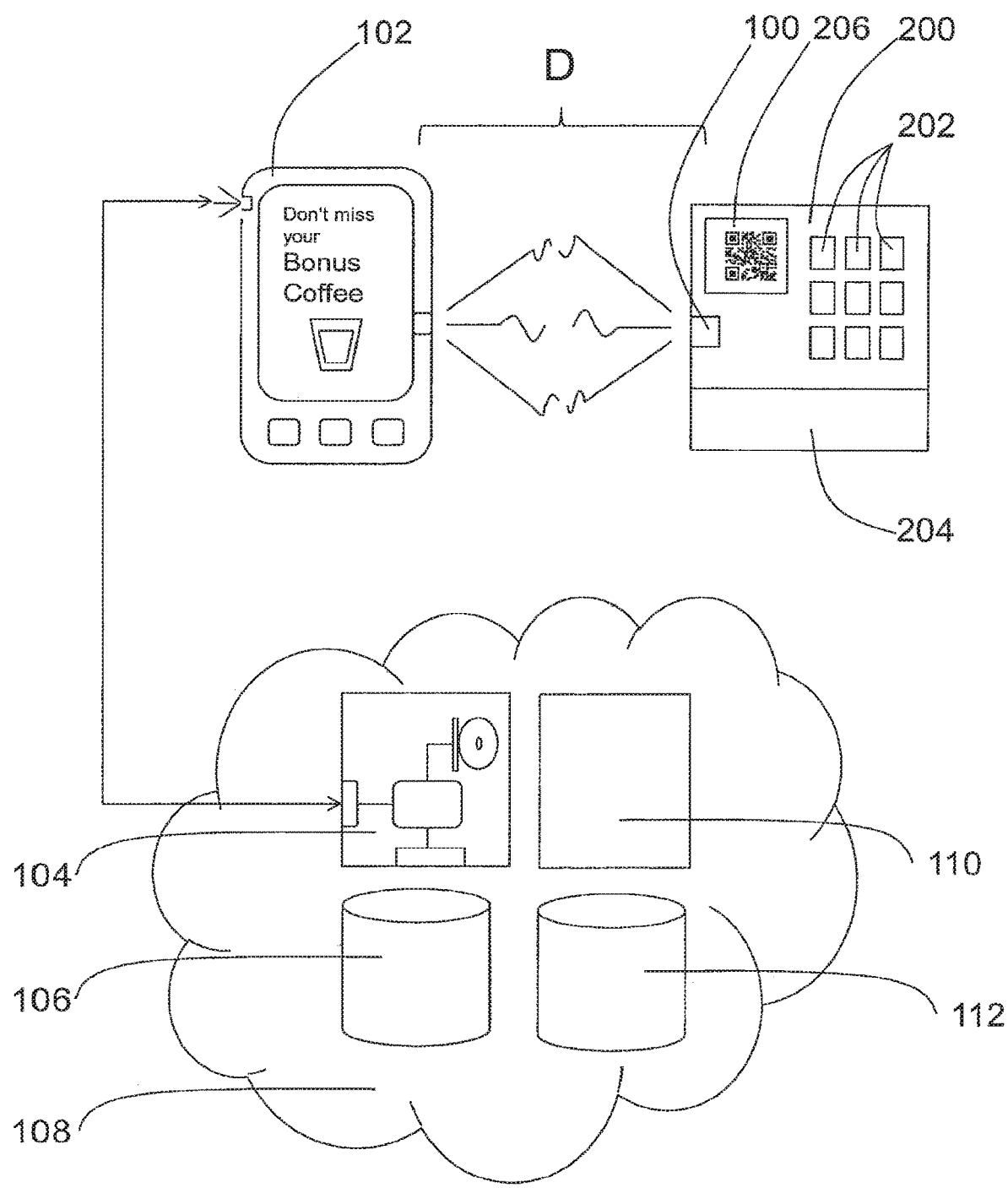
FIG. 2 illustrates a further embodiment of a system for managing an account.

Further, as illustrated in FIG. 2, tag element 100 may also form part of a more complex device located at the merchant's store, such as a checkout device 200 at a checkout desk. In the example depicted in FIG. 2, checkout device 200 includes operation keys 202 e.g. for entering pricing information, a cash repository 204, and a display device 206. Further, checkout device includes tag element 100, which tag element may actively communicate the value. For example, the value may be determined by checkout device 200 depending on the pricing information, or the value may be typed-in by using operation keys 202. The value may then be provided to tag element 100. Tag element 100 may be adapted to represent the value, e.g. to passively or actively communicate the value to mobile device 102.

In a passive communication mode, tag element 100 may be adapted to represent the value by modifying a radio frequency field depending on the value. In an active communication mode, tag element 100 may be adapted to represent the value by providing a further radio frequency field depending on the value.

The passive communication mode may be used in the embodiment illustrated in FIG. 1. For example, mobile device 102 may emit a radio frequency field, which radio frequency field is modified by tag element 100 depending on the represented value. This modification may be observed by mobile device 102, e.g. by measuring the modified radio frequency field and determining the value depending on the modification. Thus, mobile device 102 provides a carrier field and tag element 100 answers by modulating the carrier field. In this mode, tag element 100 may draw its operating power from the carrier field. Thus, tag element 100 may include an unpowered near field communication chip or radio frequency identification chip, and does not need a power supply.

As a consequence, tag element 100 may be a small device, manufactured and used at low cost. However, for representing different values, a plurality of tag elements may be needed. Thus, tag elements representing one bonus point, five bonus points, ten bonus points and hundred bonus points or the like may be provided to the merchant. This solution may be realized at low cost and may be particularly suited for small merchants having no or little electronic infrastructure in their stores.

The active communication mode may be used in the embodiment illustrated in FIG. 2. Tag element 100 of FIG. 2 may be adapted to represent the value in an active communication mode by providing, in response to a radio field emitted by mobile device 102, a further radio frequency field representing the value. Tag element 100 may be powered by checkout device 200 and may thus be able to generate its own field. This allows a stable and secure communication actively performed by both participants, mobile device 102 and tag element 100.

Display device 206 may further be adapted to display an optical, e.g. machine-readable representation of the value, e.g. a bar code or QR Code™ for optical recognition via scan or photography. Thus, the value may also be readable by mobile devices participating at the bonus program that are not equipped with a tag reader adapted to communicate with tag element 100. Display device may thus ensure legacy support for mobile devices including e.g. a camera. Further legacy support may be achieved by distributing traditional paper cards to customers without any electronic reading facility adapted to recognize the value.

Figure 3:
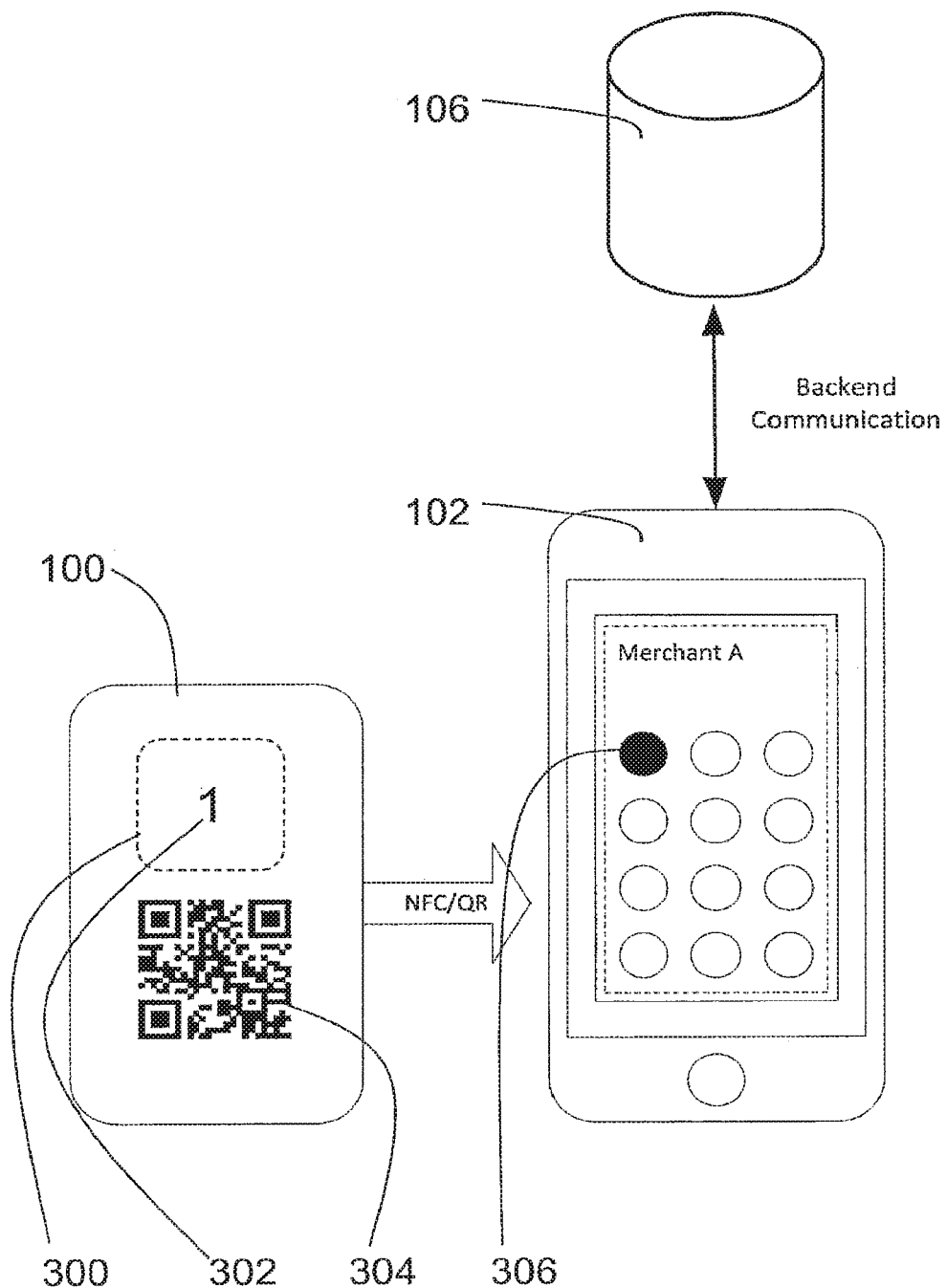
FIG. 3 illustrates a further embodiment of a system for managing an account.

In FIG. 3, a further embodiment of the system for managing an account is depicted. In the embodiment, the tag element 100 is a passive near field communication tag such as a smart card or the like, which is being handed out to the merchant, and which can be designed according to the merchant's requirements and cooperate design. Optionally, as discussed above, several cards representing different values may be provided.

Tag element 100 may include a near field communication chip 300 representing a value of one, an optical, human-readable representation 302 of the value e.g. for customer and merchant control, and an optical, machine-readable representation of the value. e.g. a bar code or QR Code™ ensuring legacy support for customers with mobile devices including a camera, but no near field communication device.

In the situation depicted in FIG. 3, a merchant A intends to reward his customer and owner of mobile device 102 with one bonus point, e.g. for a purchase. Thus, the merchant presents tag element 100, and the customer approaches mobile device 102 so as to enable near field communication of the value represented by tag element 100 to mobile device 102. Further, supplementary identification data, such as tag identification data identifying a provider of the tag or alternatively the merchant may be transmitted from tag element 100 to mobile device 102 via near field communication. Data may be received by the application executed by mobile device 102, e.g. a software application provided by a provider of the bonus program and received at mobile device 102 e.g. during enrolment with the bonus program.

The application may transmit the value and optionally corresponding identification data, representing the number of bonus points, the customer's ID and the merchant's ID via back end communication to a back end system including database 106. This communication may be performed via a network for mobile communication and/or via the internet, accessed by mobile device 102 by any suitable access method, e.g. using GSM, UMTS, LTE. TCP/IP, WLAN, Bluetooth etc, or any combination thereof. Once the bonus point is recorded or stored in the corresponding account in database 106, mobile device 102 may receive an acknowledgement of transfer via back end communication, which acknowledgement may be presented to the customer at a display, e.g. by a graphical representation 306 of the bonus point stored within the account, i.e. within the virtual bonus card of the customer for collecting bonus points of merchant A.

Figure 4:
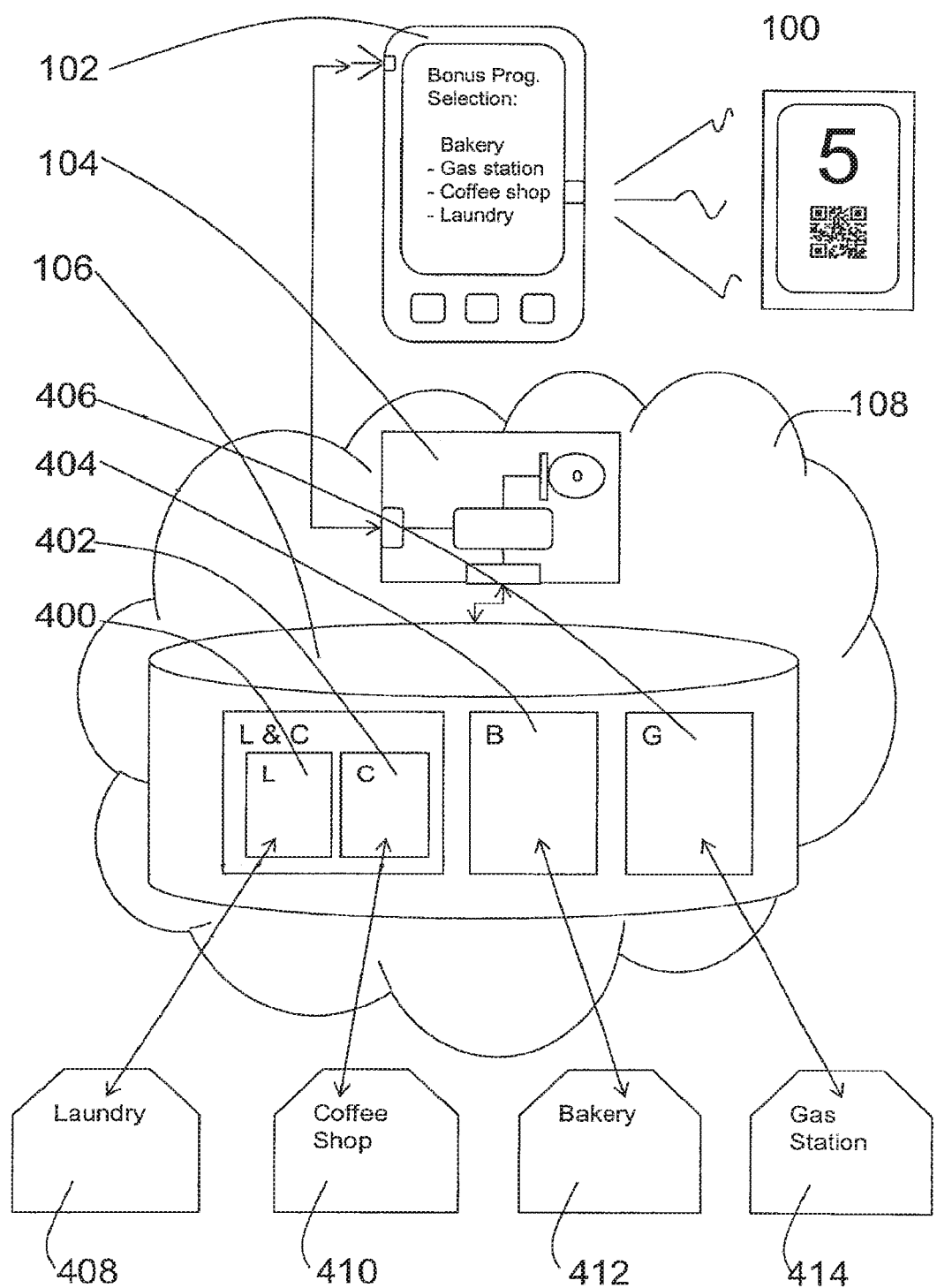
FIG. 4 illustrates a further embodiment of a system for managing an account, demonstrating an organization of a database for account management by various merchants.

In FIG. 4, a further embodiment of the system for managing an account is illustrated. In the situation depicted, the owner of mobile device 102 intends to access one of a plurality of personal accounts (personal virtual bonus cards) which are respectively related, according to the information displayed at mobile device 102, to a bakery, a gas station, a coffee shop and a laundry. In the situation depicted, one of the accounts (one of the virtual bonus cards) may be selected at mobile device 102, and the selection may be communicated to server 104 via the network.

Upon the selection request, server 104 accesses database 106, in which the corresponding accounts 400, 402, 404, and 406 are stored. Account data may then be transmitted from database 106 via server 104 and the network to mobile device 102, at which the corresponding merchant and optionally the amount of registered bonus points may be displayed. The mobile device may be presented to the merchant, e.g. for registering further bonus points from tag element 100.

As illustrated, database 106 is adapted to store a plurality of accounts 400, 402, 404, 406 related to mobile device 102, wherein each of the plurality of accounts 400, 402, 404, 406 is related to a predetermined group of account providers (merchants) 408, 410, 412, 414, the predetermined group including at least one account provider (merchant).

For example, database 106 may include accounts 400, 402, 404 and 406 with respect to laundry 408, coffee shop 410, bakery 412, and gas station 414.

In the example depicted, several merchants, such as bakery 412 and gas station 414, provide separate bonus programs, i.e. separate accounts to their customers. These merchants may specify the features of his bonus program according to their likings, thereby arriving at an optimized bonus program adapted to their needs. For example, bakery 412 may reward its customers by providing the 11th item of a predetermined type for free. Contrasting to this, gas station 414 may offer its customers to collect a "reward cent" per purchased litre or gallon of gas. Thus, the system allows decentralization as far as it is desired from a perspective of the merchants.

On the other hand, the separate accounts are stored and managed within the same platform. Thus, the customer may access any of the separate accounts by using his one single mobile device 102 and application. Accordingly, customers can conveniently manage the bonus programs they participate in.

In other words, database 106 aggregates participating bonus programs in a central, clearly arranged platform, which however allows decentralization as far as it is needed. The system may thus be regarded as "hybrid".

Further, as shown for accounts 400 and 402, merchants may team-up and join their bonus programs. For this, the merchants may be enabled to specify rules or to select predefined rules for joining their bonus programs. The rules may be specified and/or selected within the respective merchant's accounts. Further, also a joint merchant account may be set up.

In the example depicted, laundry 408 and coffee shop 410 have teamed-up, allowing their customers to exchange bonus points gained at laundry 408 into bonus points of coffee shop 410 and vice versa. However, both accounts may also be accessed separately.

In a further embodiment of the system depicted in FIG. 4, the database may be adapted to store rules for transferring a value from the account to a further account, exchanging values between the account and the further account, buying and/or selling values with respect to the account and/or joining the account and the further account. Server 104 may be adapted to modify the account and/or the further account in accordance with the rules, e.g. upon a request communicated by mobile device 102.

In the example depicted in FIG. 4, laundry 408 and coffee shop 410 may have specified rules (or selected and acknowledged predetermined rules from the database provider) for joining their bonus programs, making their bonus points exchangeable. Thus, both merchants have full control over the manner of teaming-up and joining their bonus programs. Accordingly, customer loyalty and effectiveness of the bonus program can be further increased. For example, laundry 408 may hope to attract customers by providing bonus points for a free coffee at the coffee shop around the corner that may be consumed during washing.

Figure 5:
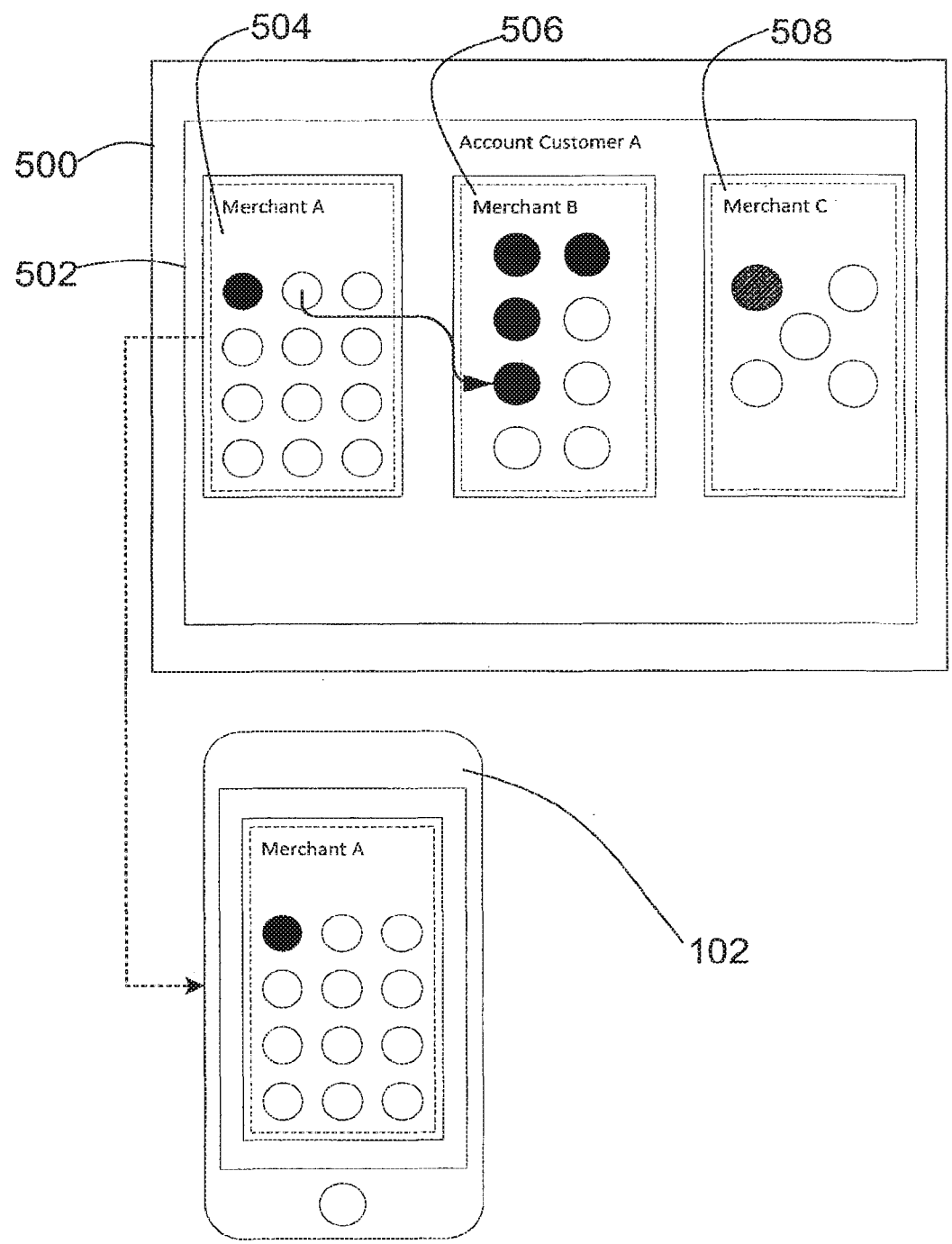
FIG. 5 illustrates a use case of a customer managing his bonus points collected from different merchants.
Figure 6:
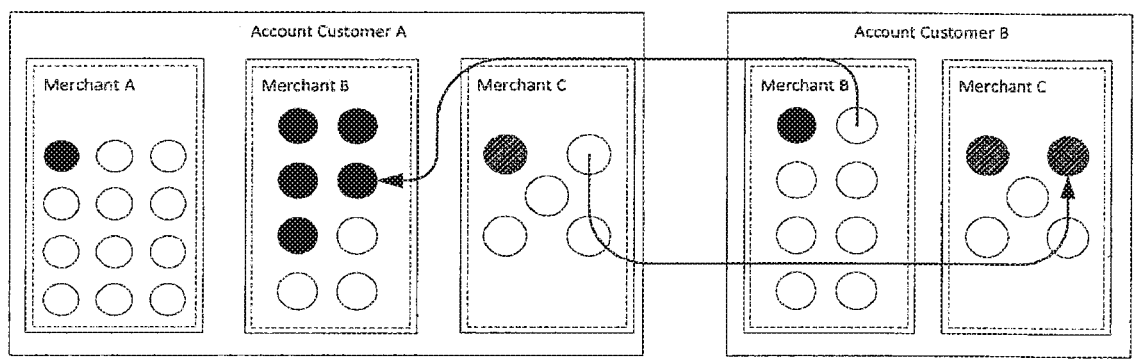
FIG. 6 illustrates a use case of two customers trading and/or exchanging bonus points collected from different merchants.

FIGS. 5 and 6 illustrate rules for managing the accounts in database 106.

In FIG. 5, it is illustrated at block 500 that an account 502 of a customer A includes merchant-specific accounts 504, 506, 508 with respect to merchants A, B and C. The accounts 502, 504, 506, 508 are stored and managed within database 106, and can be accessed through backend communication by mobile device 102.

In the case depicted, it is to be assumed that merchants A and B have teamed-up and have specified a rule that a customer of both merchants can move points from one account 504 to the other 506. The moving may for example be initiated by a corresponding request entered on a graphical user interface of the application run at mobile device 102, providing access to database 106, For example, the application may allow moving points by drag-and-drop.

FIG. 6 illustrates that customers may be given the opportunity to trade and/or exchange bonus points with other participants. In the example depicted, customer A transfers one bonus point of merchant C to customer B and in return receives a bonus point of merchant B. Such an exchange can be allowed e.g. at fixed, previously defined exchange rates or according to rules which may be freely defined between merchants allowing these operations. For enabling further trading, an intermediary virtual currency could be introduced. Further, prices can be determined based on the principle of offer and supply.

From FIGS. 5 and 6, it becomes clear that the rules for managing bonus points as far as permitted by the merchants, e.g. the possibility to transfer bonus points between accounts of cooperating merchants or to transfer bonus points to other users and receive bonus points from other users, enhance the customer benefit.

Figure 7:
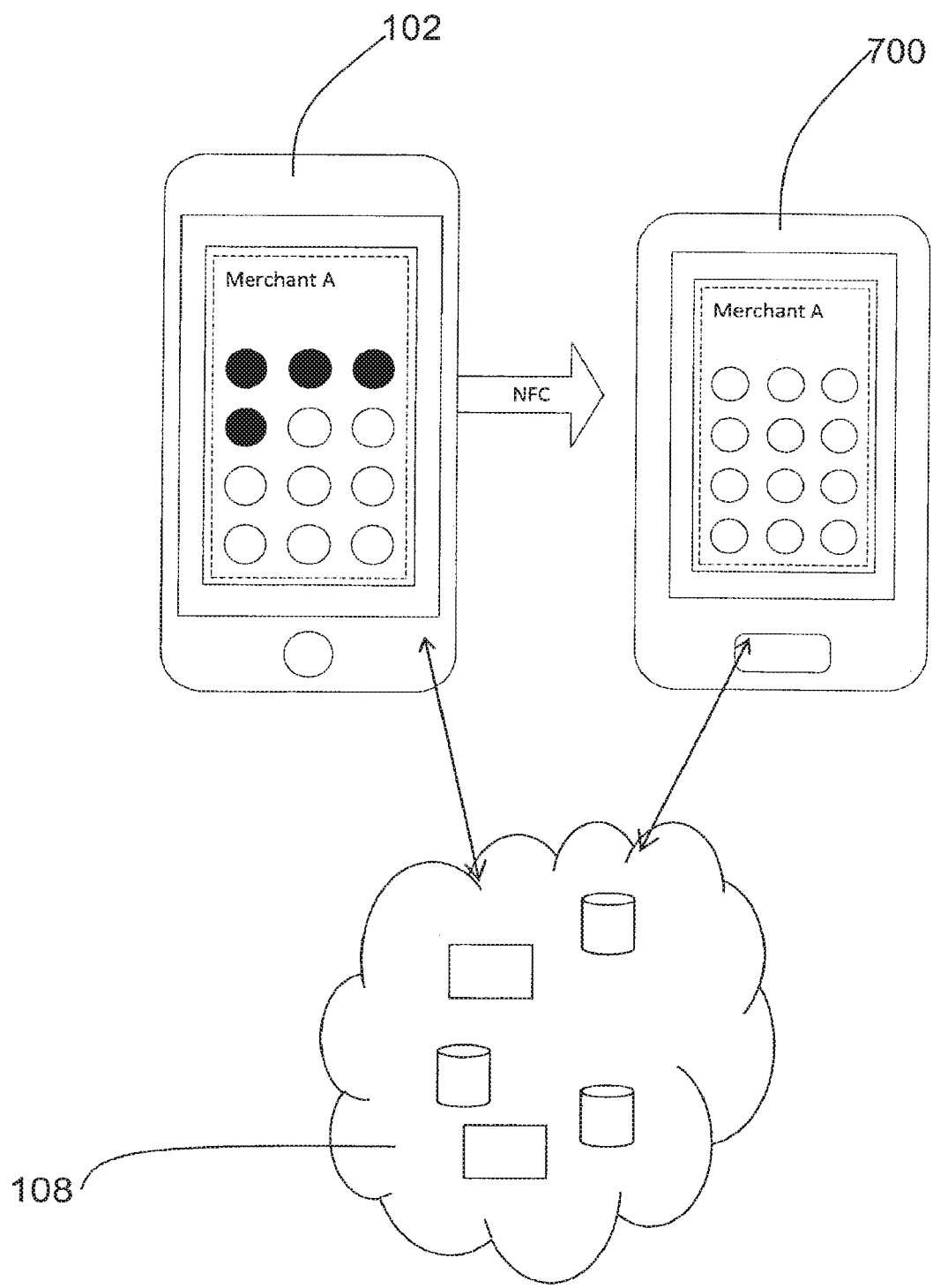
FIG. 7 illustrates a use case of a customer recommending a merchant to another person.

In FIG. 7, an embodiment of the system is illustrated in which personal recommendations may be supported and rewarded. Personal recommendations represent one of the most important dissemination channels for a merchant. The acquisition of a significant share of a merchant's customers can often be traced back to a few loyal and satisfied customers that function as "dissemination hubs" and therefore are extremely valuable to a business. Treating such customers particularly carefully and rewarding them for their dissemination activities can improve business success.

In the case depicted, it may be assumed that the customer owning mobile device 102 is satisfied with merchant A's products or services, and gains knowledge of a further person's need for a corresponding product or service. The further person may be owner of a further mobile device 700. Mobile devices 102 and 700 may be adapted to communicate with each other, e.g. when being located in mutual proximity as defined in the above, e.g. by near field communication.

In particular, mobile device 102 may be adapted to transmit first information to further mobile device 700, the first information being related to the account and/or to an account provider of the account. For example, the first information may include information related to merchant A, recommending merchant A as providing the product or service needed by the further person, and may further include details on how to contact merchant A, such as a shop address, a link to a home page of merchant A, opening hours or the like. Thus, recommendation information may be transmitted from mobile device 102 to further mobile device 700.

Further, mobile device 102 and/or further mobile device 700 may be adapted to send, upon transmission of the first information (i.e. the recommendation information) second information to the account provider and/or to the server located in cloud environment 108. The second information may be related to at least one of mobile device 102, the first information and a request for storing a further account related to further mobile device 700 and related to the account provider (e.g. merchant A) in the database.

Thus, mobile device 102 and/or further mobile device 700 may be adapted to provide the second information, informing the account provider (e.g. merchant A) on the recommendation, in particular, mobile device 102 (and thus the person having issued the recommendation) may be identified, and the further information (e.g. further information regarding the recommendation) may be provided to merchant A. Thus, merchant A gains knowledge on all necessary details regarding the recommendation. This may be helpful for optimizing his business and for rewarding the recommending customer. Further, the potential new customer (further person) may be provided with a new bonus account (further account, e.g. related to further mobile device 700 and to the account provider, e.g. merchant A). The further account may be empty or already provided with some initial bonus points as an incentive for following the recommendation.

Still further, the first information may include all necessary data for downloading the application to further mobile device 702. Thus, after the download has terminated, the application may be started, showing merchant A's bonus program together with the new bonus card.

The electronic support of the recommendation process is beneficial for all of its participants. Firstly, the merchant gains information on customers recommending his business, and is able to provide a reward for recommendation. The merchant is further able to provide an incentive to the person receiving the recommendation, e.g. by setting some initial bonus points. The recommender may receive a reward for his recommendation activities, and the person receiving the recommendation receives the desired information with respect to merchant A and is further provided with the bonus card, eventually including some initial bonus points, Still further, the recommendation process and flow of information is supported electronically by near field communication or (as legacy support) QR Code™, allowing simple information exchange.

Figure 8:
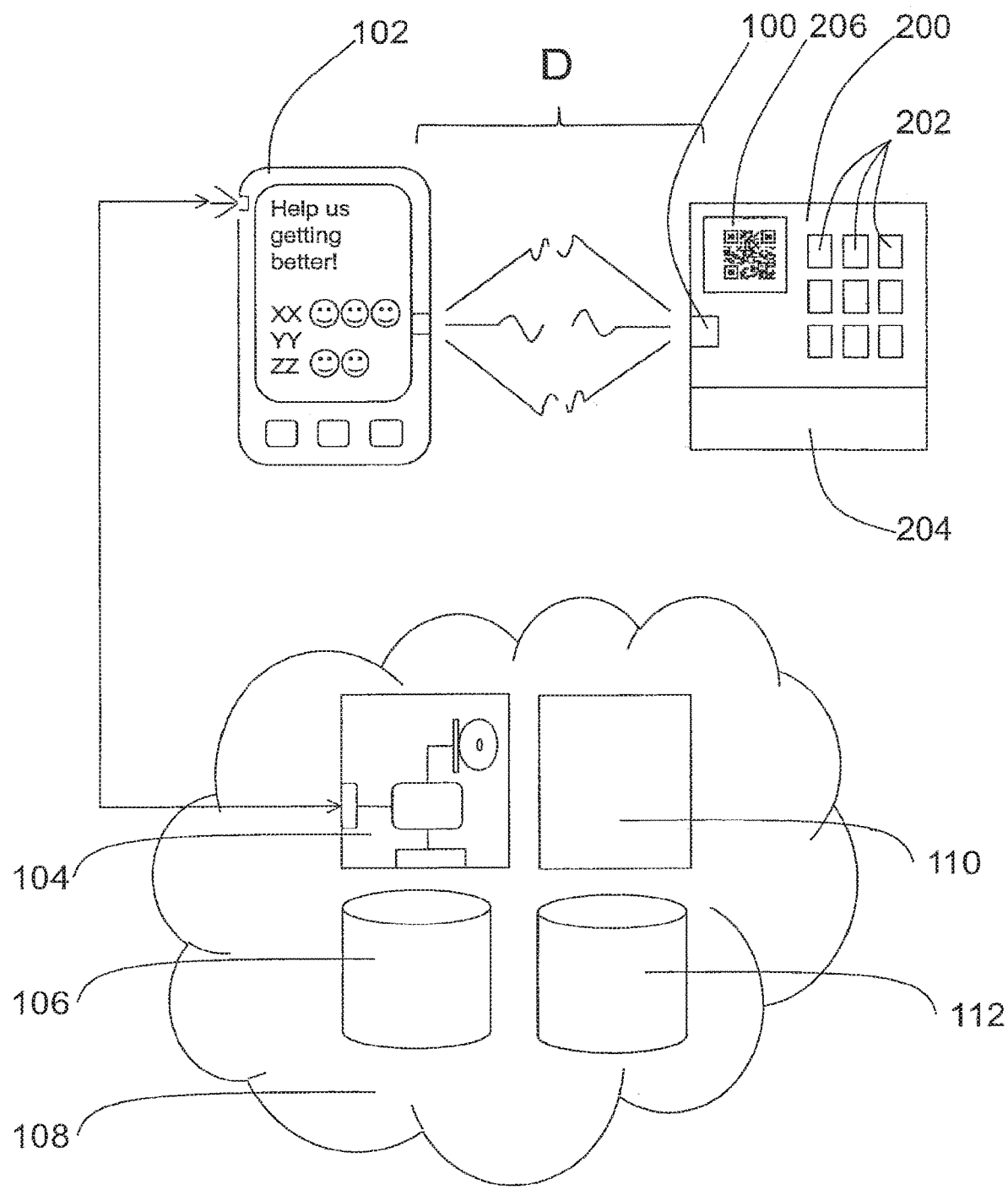
FIG. 8 illustrates a use case of a customer receiving a reward based on his bonus point collection.

FIG. 8 shows a further embodiment of the system, in which a feedback channel may be established between the bonus program participant and the merchant. In the example depicted, mobile device 102 communicates with checkout device 200 including tag element 100 e.g. via near field communication for registering bonus points. Upon transmission of the value and optionally the tag identification information and the device identification information, server 104 issues a request for feedback information to mobile device 102. If the customer agrees to providing feedback, a respective evaluation mask may appear on the display of mobile device 102. The customer may fill out the evaluation mask, and the feedback data may be transmitted to the server, where it is aggregated with further feedback information from other participants with respect to the same merchant. The aggregated feedback data may then be provided for the merchant, helping him to optimize his business. The customer may be rewarded for giving feedback, e.g. by adapting the number of bonus points according to his willingness to provide feedback. The customer may for example receive one bonus point for his purchase, and a further bonus point for providing feedback.

In the embodiment of FIG. 8, mobile device 102 may be adapted to send to server 104 feedback data relating to an interaction with an account provider of the account (e.g. the merchant). The server may be adapted to perform, based on the feedback data, a rewarding action. The rewarding action may for example include displaying, at the mobile device, a message relating to a reward (e.g. "Present this message at the counter to get a free bonus coffee") and/or modifying the account in accordance with the reward (e.g. by adding further bonus points as a reward for the feedback information).

In a further embodiment, the questions asked in the feedback mask can be determined randomly or can be modified periodically. Further, they may be modified manually according to the merchant's preferences and present needs. For example, customers may be asked how satisfied they are with the service of a person that is presently working on a trial basis. The next time, the customer may be asked whether he likes the coffee or how he would evaluate the friendliness of the merchant's personnel. Further, the evaluation mask may be determined depending on the customer. For example, customers that visit the merchant frequently and are thus familiar with the personnel and products can be asked more sophisticated or detailed questions. The frequency could for example be determined based on bonus points collected by the customer per time unit.

Figure 9:
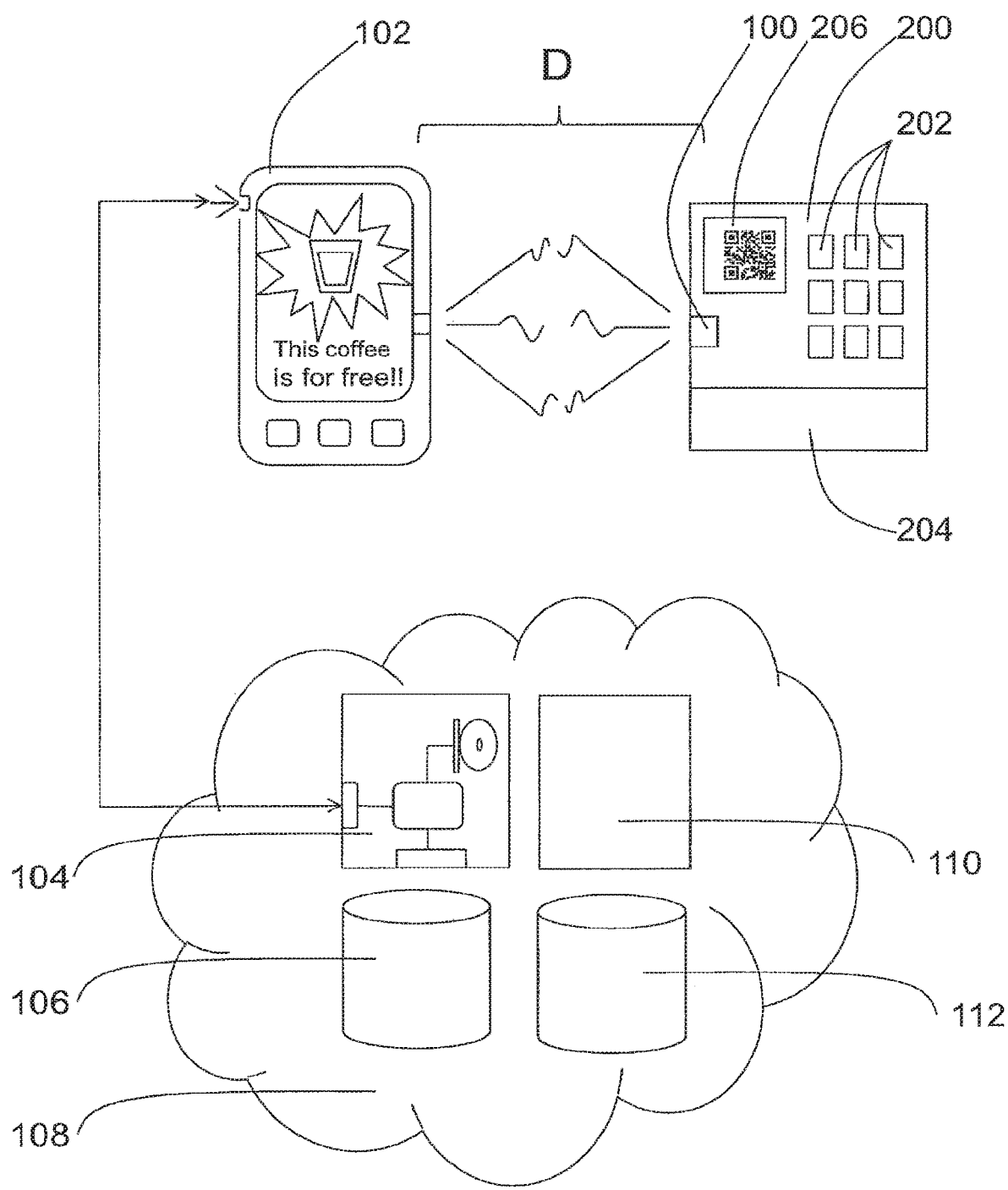
FIG. 9 illustrates a use case of a merchant rewarding feedback information through additional bonus points.

In FIG. 9, an embodiment of the system is depicted in which the customer receives a reward based on his bonus points collected in the account. As discussed in the above, the rewarding action may include displaying, at the mobile device, a message relating to the reward, and may alternatively or in addition include modifying the account in accordance with the reward.

Any of mobile device 102 and/or server 104 may be adapted to determine whether the rewarding action is to be performed. The determination on whether the reward in action is to be performed may be based on at least one of a random or pseudo-random determination process, a total value of the account, the value determined by the mobile device, a setting specifying a preference of an account user (i.e. the customer), and a request issued by the mobile device.

Within the random or pseudo-random determination process, a pseudo random number may for example be generated upon each purchase, e.g. within a range between 0 and 1. If the number falls within the range between 0.9 and 1, the customer receives his coffee for free, while otherwise, the customer has to pay. Thus, according to statistical expectation, one coffee out of ten coffees is free. However, since the free purchase is allotted, this kind of bonus program may attract customers being fond of gambling.

The rewarding action may further be determined based on a total value of the account. For example, for every 10 bonus point, the rewarding action may be performed. Thus, as a regular reward, the customer receives every eleventh coffee for free.

Further, the rewarding action may be determined based on the value determined by the mobile device. For example, for every purchase rewarded with at least ten bonus points, an additional reward may be issued or allotted. Thus, customers may receive an incentive for larger purchases.

Preferences regarding rewarding actions may for example be set as a setting in a user profile of the account user (customer). It may for example be specified whether the user prefers a random/pseudorandom rewarding process, or whether he prefers regular rewarding based on the total value of the account. Thus, the customer may adapt the bonus program according to his likings.

Further, a rewarding action may be based on a request issued by the mobile device. For example, the customer using the mobile device may send a request to the database to obtain a rebate or discount based on his stored bonus points for a current purchase. For example, the customer may use his bonus points for paying his bill at the merchant's. Then, the bonus points expended for paying the bill may be subtracted from the amount of bonus points stored in the account.

With respect to the embodiments illustrated in FIGS. 1 to 9, it should be noted that any embodiment may also include a cloud environment, e.g. a private cloud, community cloud or public cloud. It is thus to be understood that mobile devices 102, 700 as well as server 104 and database 106 may be coupled to a cloud computing environment, and that any of the steps or tasks to be performed, may be performed by any of the devices included in the cloud computing environment.

Cloud computing is to be understood as a model for enabling ubiquitous, convenient, on-demand network access to a shared pool of configurable computing resources, e.g. networks, servers, storages, applications, and services, that can be rapidly provisioned and released with minimal management effort and/or with minimal or no service provider interaction at all.

Any of the tasks described herein may be performed by any component of the cloud, e.g. by rapid assignment and release. Thus, applications running in the cloud environment, i.e. provided by the cloud infrastructure, may be provided to the consumers, i.e. customers using mobile device 102 and further mobile device 700, by rapid assignment and release. The applications may be accessible from the various devices for example through a thin client interface such as a web browser or a program interface. Alternatively or in addition, applications may also be downloaded from the cloud (i.e. from a server located in the cloud) and run at any of mobile devices 102, 700.

It should be understood that for users of the various mobile devices, it is not necessary and further perhaps not possible to manage or control the underlying cloud infrastructure including network, servers, operating systems, storage, or even individual application capabilities. However, limited user-specified application configuration settings may be possible.

It should further be noted that the system may be designed as a private cloud or community cloud providing the cloud infrastructure for exclusive use to a predefined group of members or to a specific community of consumers and merchants having shared concerns, i.e. the wish to provide a bonus program for customers or the wish to participate at a bonus programs offered by a merchant. The cloud infrastructure may be owned, managed, and operated by one or more of the organizers of the community, by a third party, or by some combination of them, and it may exist on or off premises.

Further, the cloud infrastructure may also be organized as a public cloud provisioned for open use by the general public. It may be owned, managed and operated by a business, academic or government organization, or some combination of them. It may exist on the premises of the cloud provider.

The cloud infrastructure may also be a hybrid cloud, i.e. a composition of two or more distinct cloud infrastructures (private, community, or public) that remain unique entities, but are bound together by standardized and/or proprietary technology that enables data and application portability.

It should further be noted that all definitions of the terms used herein are to be reflected in the cloud computing environment. Accordingly, a stretched interpretation of the terms in the sense of the dynamic attribution of tasks to different cloud structures is possible.

Concluding, any description related to an interaction between the devices shown in the embodiments of FIGS. 1 to 9 and any assignment of transactions or of method steps that will be discussed in the following may be subject to a stretched interpretation and may thus be dynamically shifted in the cloud environment.

Figure 10A:
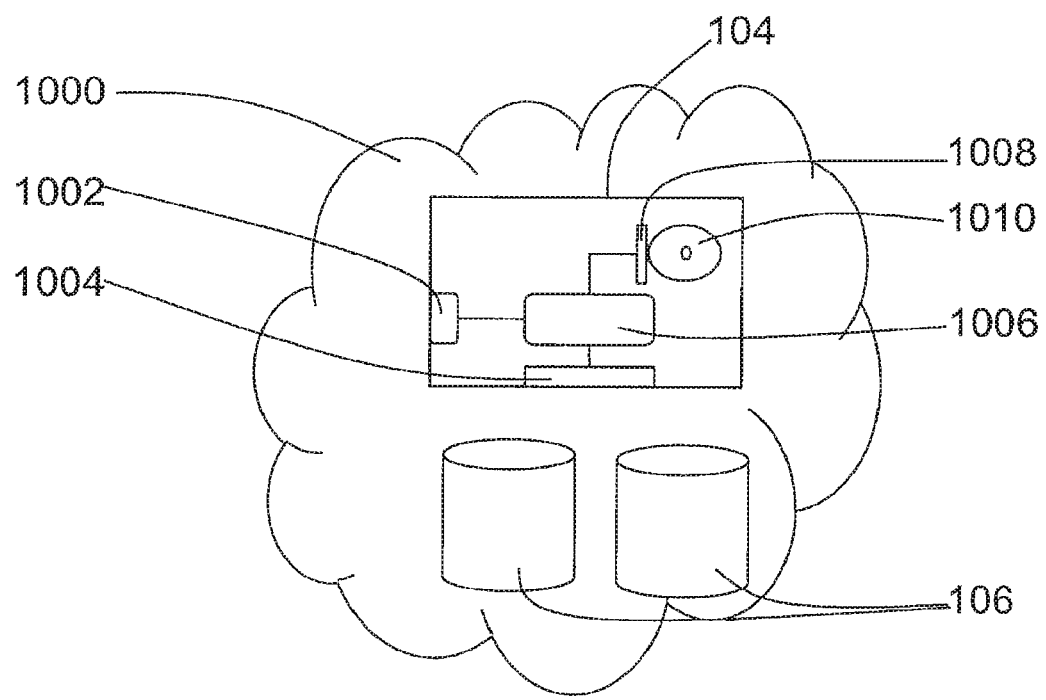
FIG. 10a illustrates an embodiment of a server for managing an account.

FIG. 10a illustrates an embodiment of server 104 adapted for use in a system for managing an account, e.g. for use in this any of the embodiments depicted in FIGS. 1 to 9. Server 104 may form part of a cloud computing environment 1000 as described above, accessible from mobile device 102 via the network.

Server 104 may include a network interface 1002 adapted to communicate over the network with mobile device 102.

Further, server 104 may include a database access interface 1004 adapted to provide access to database 106, in which the account is stored. The database 106 may be stored locally at server 104 or remotely on a separate storage device within cloud computing environment 1000, which storage device may be accessible from server 104 e.g. via a further network. Database access interface 1004 may be adapted e.g. for sending database queries, sending data to be included into the database 106, or receiving data from database 106.

Further, server 104 may include a processor 1006 adapted to receive, from mobile device 102 and via communication interface 1002, the value represented by tag element 100, to generate a request for adding the value to the account, and to transmit the request to the database 106 via database access interface 1004.

Further, server 104 may include a reading device 1008 for reading a non-transitory computer-readable medium 1010 including a computer program, the computer program including computer program instructions which, when executed by processor 1006, cause server 104 to perform a method. The method may comprise determining, using a tag reader of mobile device 102, a value represented by tag element 100 located in a proximity of the tag reader, transmitting the determined value from mobile device 102 to server 104 and adding, in database 106 accessible by server 104, the determined value to the account, the account being related to the mobile device 102 and to the tag element 100.

Figure 10B:
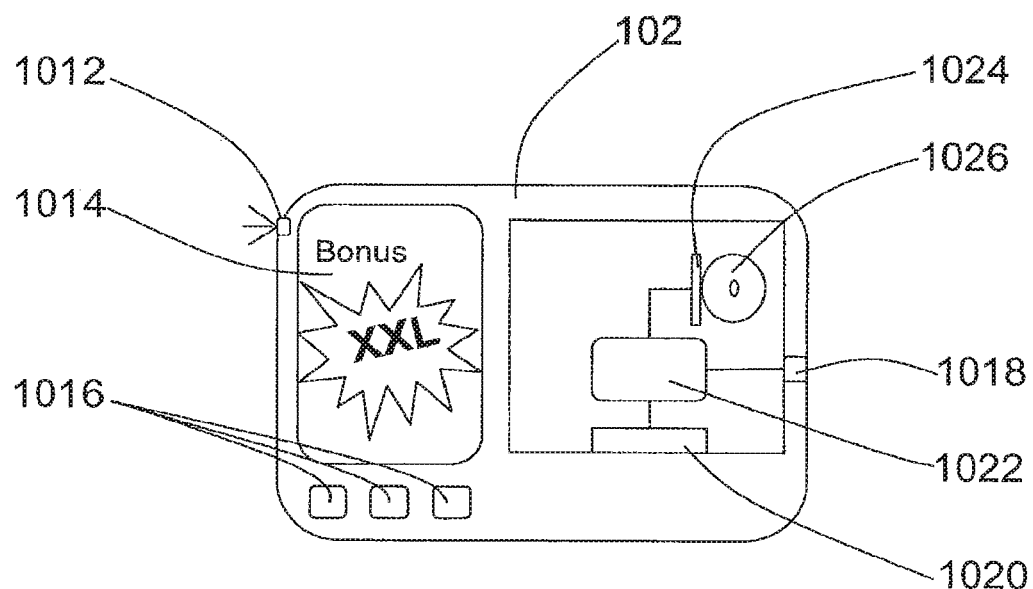
FIG. 10b illustrates an embodiment of a mobile device for managing an account.

FIG. 10b illustrates an embodiment of mobile device 102 or of further mobile device 700 adapted for use in a system for managing an account, e.g. for use in this any of the embodiments depicted in FIGS. 1 to 9. Mobile device 102 may access and thus form part of cloud computing environment 1000 as described above, which cloud computing environment may be accessible from mobile device 102 via the network.

For accessing server 104 and/or cloud computing environment 1000, mobile device 102 may include an antenna 1012 for communicating via the network, e.g. the mobile telecommunications network providing access e.g. to the Internet. Further, mobile device 102 may include a display 1014 and operation keys 1016 forming a graphical user interface to the user, i.e. the customer.

Further, mobile device 102 may include a tag reader 1018 adapted to receive, when being located in a proximity of e.g. tag element 100, a data signal representing the value of the tag element 100. The tag reader 1018 may for example include a near field communication enabling chip. Tag reader 1018 may further be adapted to communicate, when being located in proximity of further mobile device 700, with further mobile device 700.

Still further, mobile device 102 may include a network interface 1020 adapted to communicate, using e.g. antenna 1012, with server 104 and with other devices within cloud computing environment 1000. Further, mobile device 102 may include a processor 1022 adapted to determine the value based on the data signal and to communicate the determined value via the communication interface to the server.

Additionally, mobile device 102 may include a reading device 1024 for reading a non-transitory computer-readable medium 1026 including a computer program, the computer program including computer program instructions which, when executed by processor 1022, cause mobile device 102 to perform a method. The method may comprise determining, using tag reader 1018 of mobile device 102, a value represented by tag element 100 located in proximity of the tag reader, transmitting the determined value from mobile device 102 to server 104 and adding, in database 106 accessible by server 104, the determined value to the account, the account being related to the mobile device 102 and to the tag element 100.

Mobile device 102 may for example be a mobile phone, a cell phone, smartphone, a personal digital assistant, a portable personal computer such as a laptop or tablet PC or any other mobile device providing network access and including a near field communication enabling chip.

Figure 11:
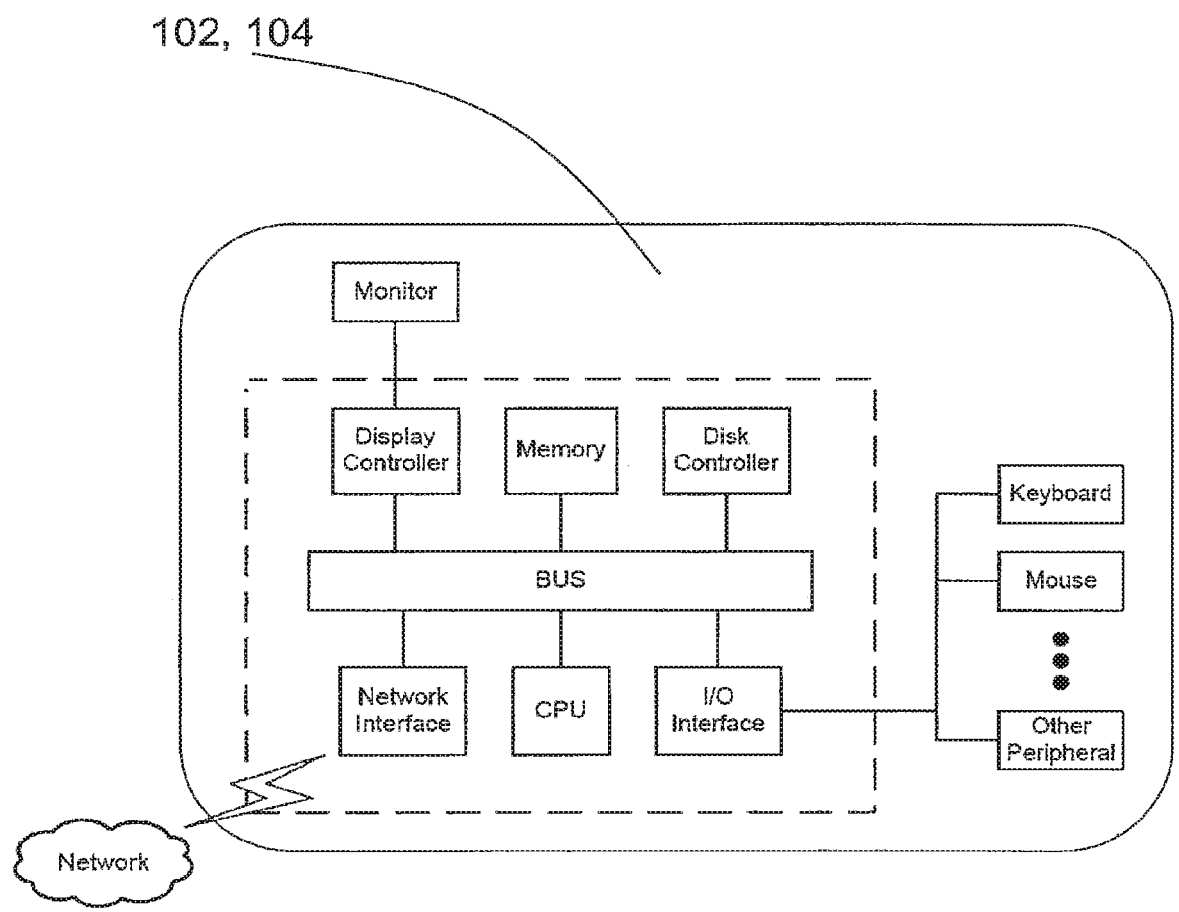
FIG. 11 illustrates a hardware infrastructure of a device forming part of a system for managing an account, e.g. of the mobile device and/or the server.

FIG. 11 is a hardware diagram of a processing system e.g. of mobile device 102 and/or server 104, embodying aspects of this disclosure, including aspects involving a computer utilized to manage the account, which can communicate with other devices or mobile terminals. The processes, algorithms and electronically driven systems described herein can be implemented via a discrete control device or computing system consistent with the structure shown in FIG. 11. Such a system is described herein as a processing system.

As shown in FIG. 11, a processing system in accordance with this disclosure can be implemented using a microprocessor or its equivalent, such as a central processing unit (CPU) or at least one application specific processor ASP (not shown). The microprocessor utilizes a computer readable storage medium, such as a memory (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-core CPU.

In another aspect, results of processing or the input of data in accordance with this disclosure can be displayed via a display controller to a monitor. The display controller would then preferably include at least one graphic processing unit for improved computational efficiency. Additionally, an I/O (input/output) interface is provided for inputting data from a keyboard or a pointing device (not shown) for controlling parameters of the various processes and algorithms of this disclosure can be connected to the I/O interface to provide additional functionality and configuration options, or control display characteristics. Moreover, the monitor can be provided with a touch-sensitive interface to a command/instruction interface, and other peripherals can be incorporated, including a scanner or a web cam when image-based data entry is used.

The above-noted components can be coupled to the network, as shown in FIG. 11, such as the Internet or a local intranet, via a network interface for the transmission or reception of data, including controllable parameters. The network provides a communication path to the mobile device, which can be provided by way of packets of data. Additionally, a central BUS is provided to connect the above hardware components together and provides at least one path for digital communication there-between.

In so far as embodiments of the disclosure have been described as being implemented, at least in part, by software-controlled data processing apparatus, it will be appreciated that a non-transitory machine-readable medium 1022 (an optical disk, a magnetic disk, a semiconductor memory or the like) may carry such software and is also considered to represent an embodiment of the present disclosure.

Figure 12A:
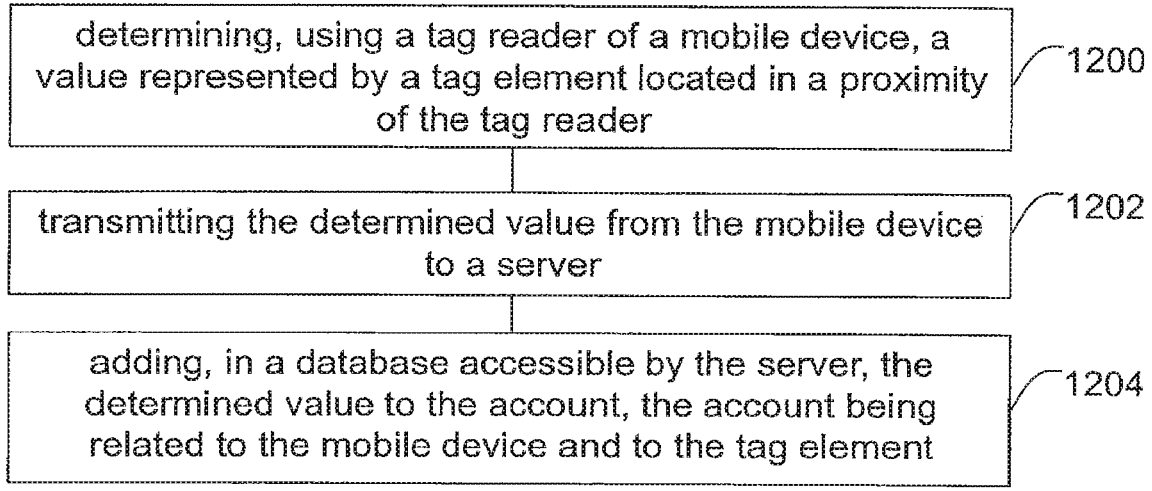
FIG. 12a illustrates an embodiment of the method for managing an account.

FIG. 12*a* illustrates an embodiment of a method for managing an account, e.g. an account in a digital bonus program. The method may be adapted to be carried out in any of the systems described in FIGS. 1 to 9 and at any of the devices illustrated in FIGS. 10 *a* to 11.

At block 1200, it is shown that a value represented by tag element 100 located in proximity of tag reader 1018 is determined, using tag reader 1018 of mobile device 102. At block 1202, transmitting the determined value from mobile device 102 to server 104 is illustrated. At block 1204, adding the determined value to the account in database 106 accessible by server 104 is shown, wherein the account is related to mobile device 102 and to tag element 100.

Figure 12B:
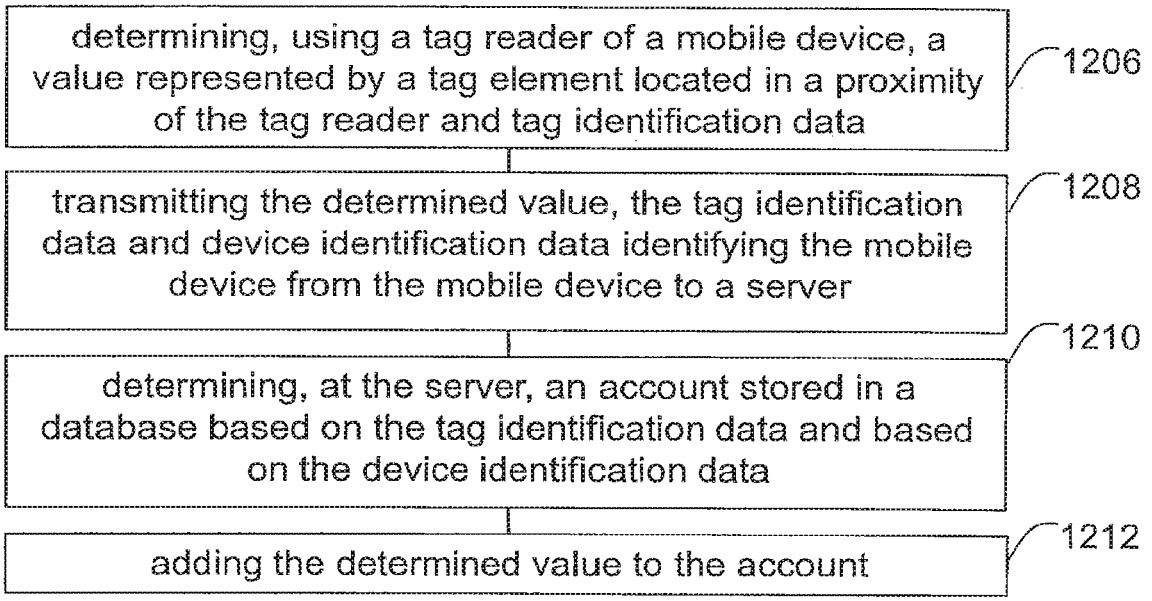
FIG. 12b illustrates a further embodiment of the method for managing an account.

FIG. 12*b* shows a further embodiment of the method. At block 1206, determining the value represented by tag element 100 located in proximity of tag reader 1018 and determining tag identification data using tag reader 1018 of mobile device 102 is illustrated. At block 1208, it is shown that the determined value, the tag identification data and device identification data identifying mobile device 102 is transmitted from mobile device 102 to server 104. At block 1210, it is shown that at the server, an account stored in database 106 is determined based on the tag identification data and based on the device identification data. Further, at block 1212, it is illustrated that the determined value is added to the account.

Figure 13:
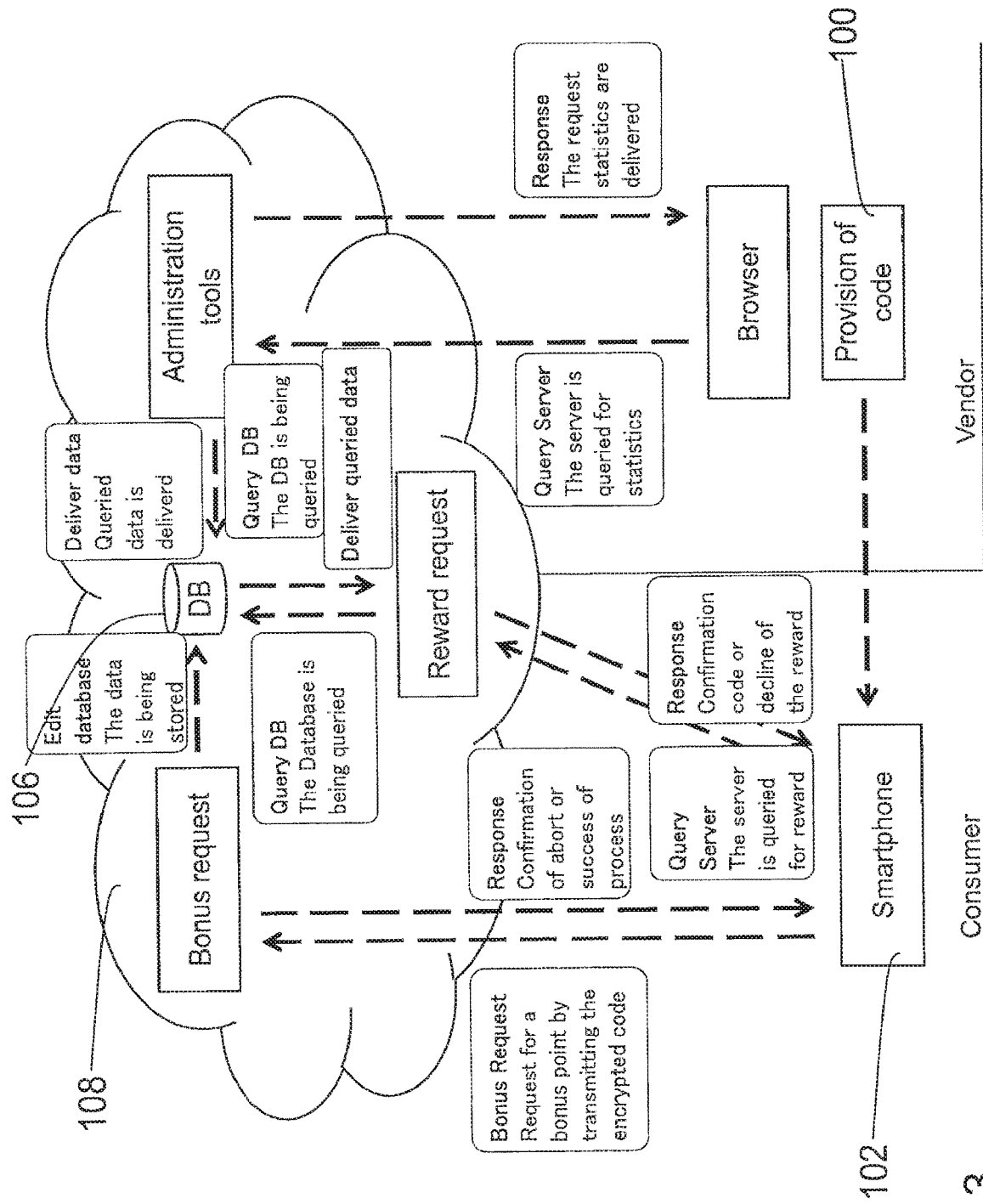
FIG. 13 illustrates a general system architecture of the bonus system.

FIG. 13 illustrates a general system architecture for the bonus system.

For obtaining bonus points, a vendor (e.g. merchant A) may provide a specific code representing the value by means of tag element 100. The code may be used by the customer using mobile device 102 to obtain a bonus point, e.g. to register the value (bonus point) at his account in database 106 located in cloud environment 108. The code, which for reasons of security may be encrypted, may be read by mobile device 102 e.g. via near field communication. In another embodiment, the encrypted code may be typewritten to mobile device 102. For entering the code, the user may access and start a specific application at mobile device 102, which application may have been downloaded in an enrolment procedure or accessed within cloud 108 e.g. via a browser, Having obtained the (encrypted) code, the application sends it to a server (e.g. server 104) located in cloud 108 in form of a "Bonus Request". The server may verify the code and grant the bonus points to the user, e.g. by storing the bonus points within database 106. The user may be notified of the result of the request. Upon an error, e.g. an encryption error and/or checksum error, the process of granting the bonus points may be aborted, and the user may be notified accordingly. This may help to enhance security, preventing unauthorized registration of bonus points.

For requesting a reward based on the bonus points e.g. registered at database 106, the customer may be enabled to enter a request to mobile device 102 for querying the count of bonus points, e.g. for each participating vendor, via the application. If enough points have been gathered, the customer may request the reward. The processing of a reward request is done within cloud 108, e.g. at server 104. After having confirmed the right for a reward by checking the customer's score at database 106, server 104 may send a confirmation of the reward to the mobile device 102, which confirmation may be displayed, by the application. e.g. at a display of mobile device 102. The vendor may thus review the confirmation on the customer's mobile device 102 and grant the reward to him. At database 106, the score may be altered by server 104 accordingly.

For obtaining statistics, the vendor may have access to an administration tool, provided e.g. by a further application which may be downloaded or may be accessible via a web browser. Within the administration tool, the vendor may request statistics regarding e.g. a usage of the bonus system. The request for statistical information may also be processed in the cloud, e.g. by server 104 or a further server. The server may query database 106 for the specific information, based on which information the server may prepare and visualize the statistical information and send it to the vendor.

Figure 14:
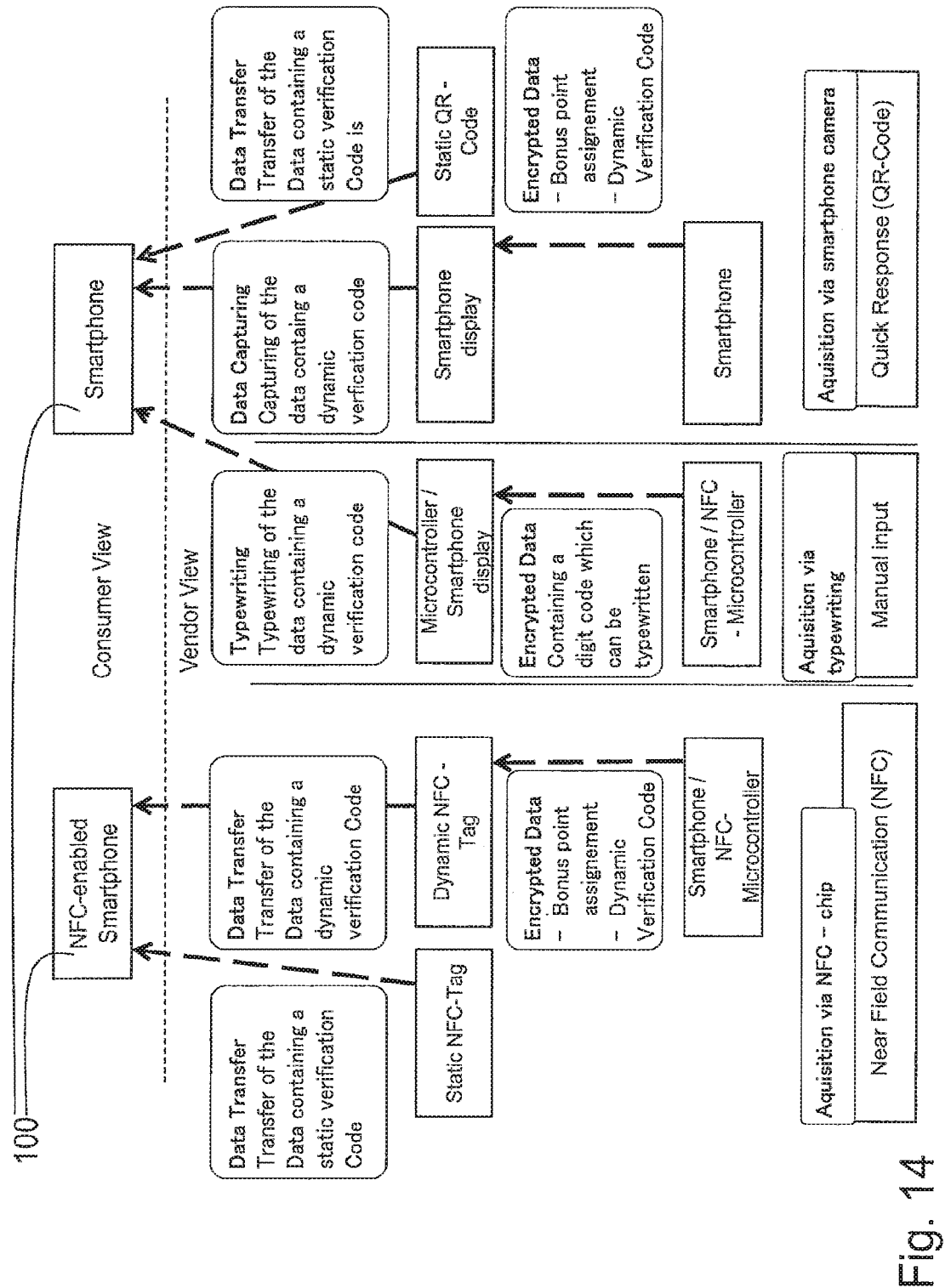
FIG. 14 illustrates a device architecture and modalities for the bonus system.

FIG. 14 illustrates a device architecture and modalities for the bonus system.

In the left part of FIG. 14, Near Field Communication (NFC) via a tag element 100 is illustrated. As discussed above, tag element 100 may be a static NFC-tag, which may be read by the application at mobile device 102, which is assumed to be an NFC-enabled smartphone.

Tag element 100 may alternatively be a dynamic NFC-Tag. For example, the vendor may use and/or trigger his smartphone, which is assumed to be an NFC-enabled smartphone including a microcontroller, to generate and/or create a code which will be available at a NFC-tag of the vendor's smartphone for a short period of time. This code may be read by the application at mobile device 102, e.g. the customer's NFC-enabled smartphone.

In an alternative embodiment illustrated in the middle part of FIG. 14, a digital code is generated by the microcontroller smartphone of the vendor and displayed at a display. This code may be typewritten by the user (customer) to mobile device 102, e.g. to the application. Also in this embodiment, the vendor has to trigger the creation of the code on the microcontroller or his smartphone. Thus, bonus point registration is under full control of the vendor.

Bonus point registration via a Quick Response Code (QR-Code™) is illustrated in the right part of FIG. 14. For example, a static QR-Code™ may be read by the customer using the application (and the camera) on his smartphone, e.g. mobile device 102. Alternatively, also a dynamic QR-Code™ may be generated by the vendor, e.g. at his smartphone. The QR-code may be displayed at a display, e.g. at the smartphones screen. The customer may then read the dynamic QR-Code using an application, e.g. via the camera of mobile device 102.

Figure 15:
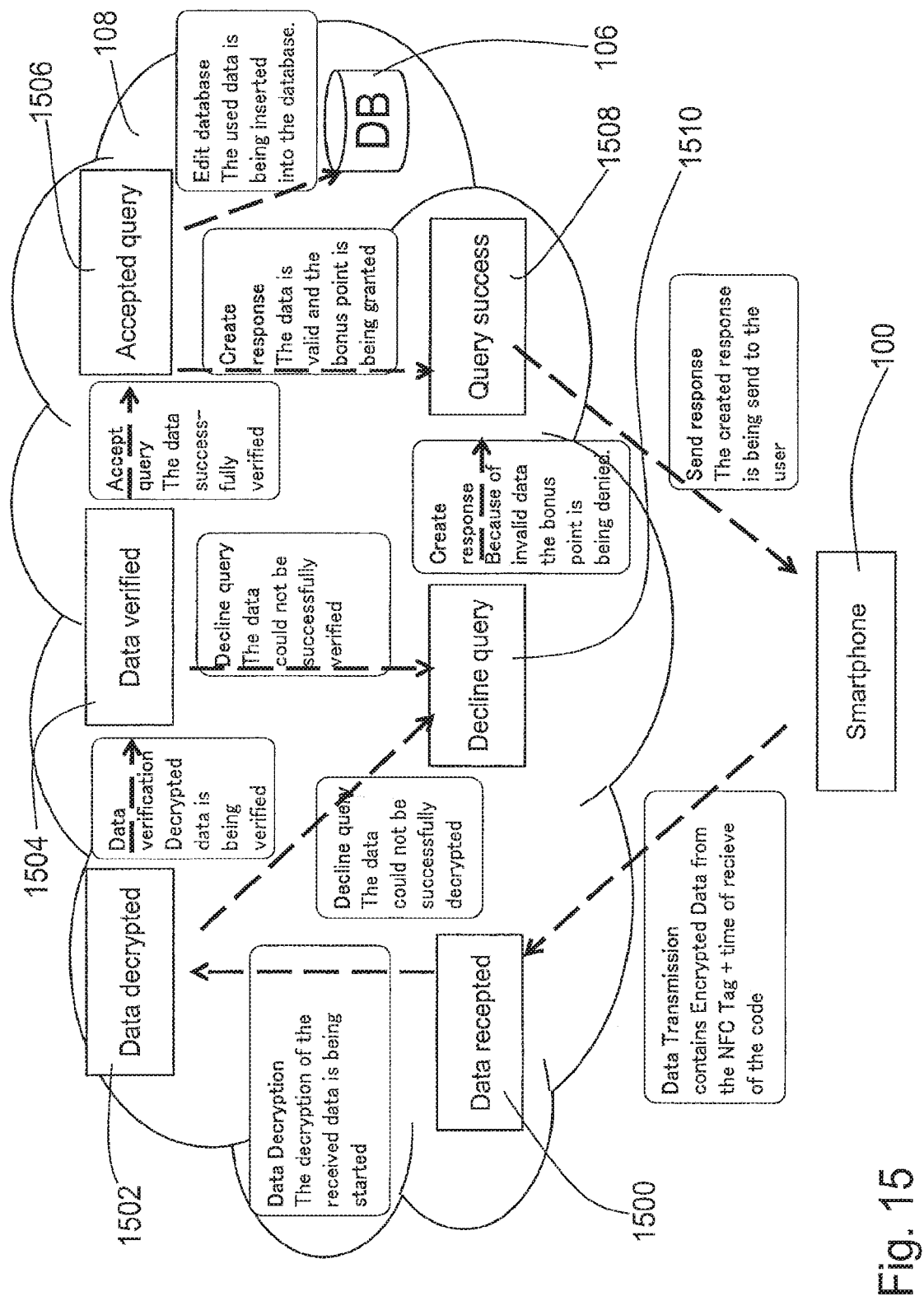
FIG. 15 illustrates the backend bonus point registration query process.

FIG. 15 shows the backend bonus point registration query process, which may take place at a server located in cloud 108, e.g. server 104.

At 1500, the server (e.g. server 104) has received a request from a smartphone containing encrypted data which has to be decrypted and verified, e.g. from mobile device 102. The server may start the decryption process.

At 1502, the server may try to decrypt the encrypted data. If the decryption was successful the server may start a data verification process. If the decryption failed, the server may decline the query and reply to the user (the customer owning mobile device 102) accordingly.

At 1504, the data may be verified. If the verification is successful, the server accepts the query and edits the database, e.g. database 106. If the verification failed, the server may decline the query. In both cases, the server may reply to the user (customer) accordingly.

At 1506, the server may prepare a message which is to be sent to the user (customer) order to confirm the successfully obtained bonus point.

At 1508, the server may prepare a message containing information about the failed attempt of obtaining a bonus point. This message may be sent to the user. In case of a decline of the query, the server may send a corresponding message to the user, as illustrated at 1510.

Figure 16:
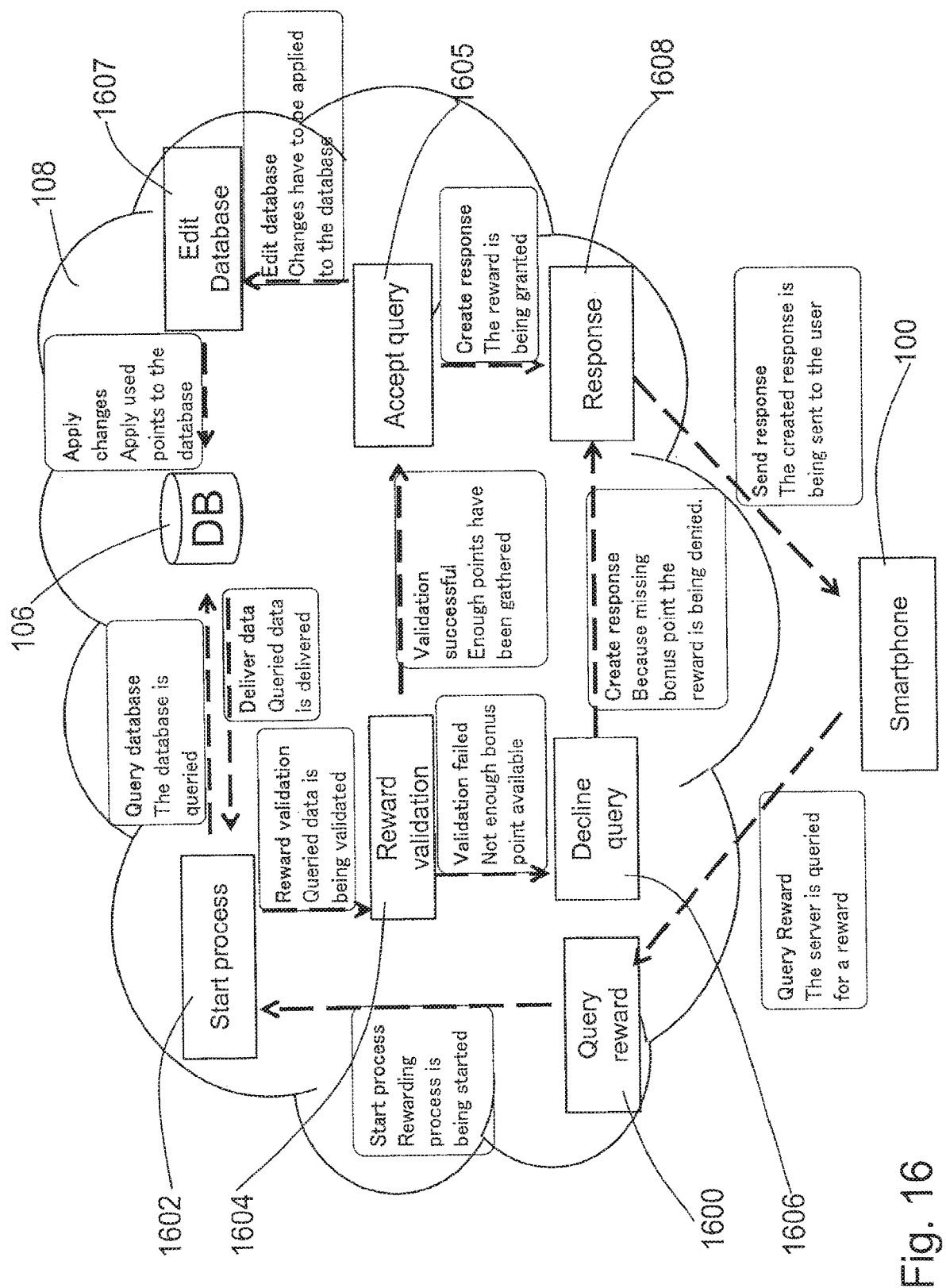
FIG. 16 illustrates the backend redemption query process (rewarding action)

FIG. 16 illustrates the backend redemption query process (rewarding action), which may be processed in cloud 108 e.g. at server 104.

As illustrated at 1600, the server (e.g. server 104) may receive a request. At 1602, the server may start processing the request e.g. by querying the database 106 in order to obtain information about the score (e.g. count of bonus points) of the user (customer) in order to verify the query for a reward. Having obtained the information, the reward validation process may be started at 1604.

For reward validation, the server may check if enough bonus points have been gathered, e.g. registered at the account stored in database 106. If there are enough points, the server may accept the query, as illustrated at 1605. Otherwise, the query may be declined, as illustrated at 1606, and the user (customer) may be notified accordingly.

Having successfully verified the score (count of bonus points), the server may create a confirmation message and may edit the database accordingly, e.g. by subtracting bonus points exchanged against the reward, as illustrated at 1607. The message may be sent to the user (customer), as illustrated at 1608.

If the reward could not be granted, a message containing the reason for declining the reward may be sent to the user at 1608.

Figure 17:
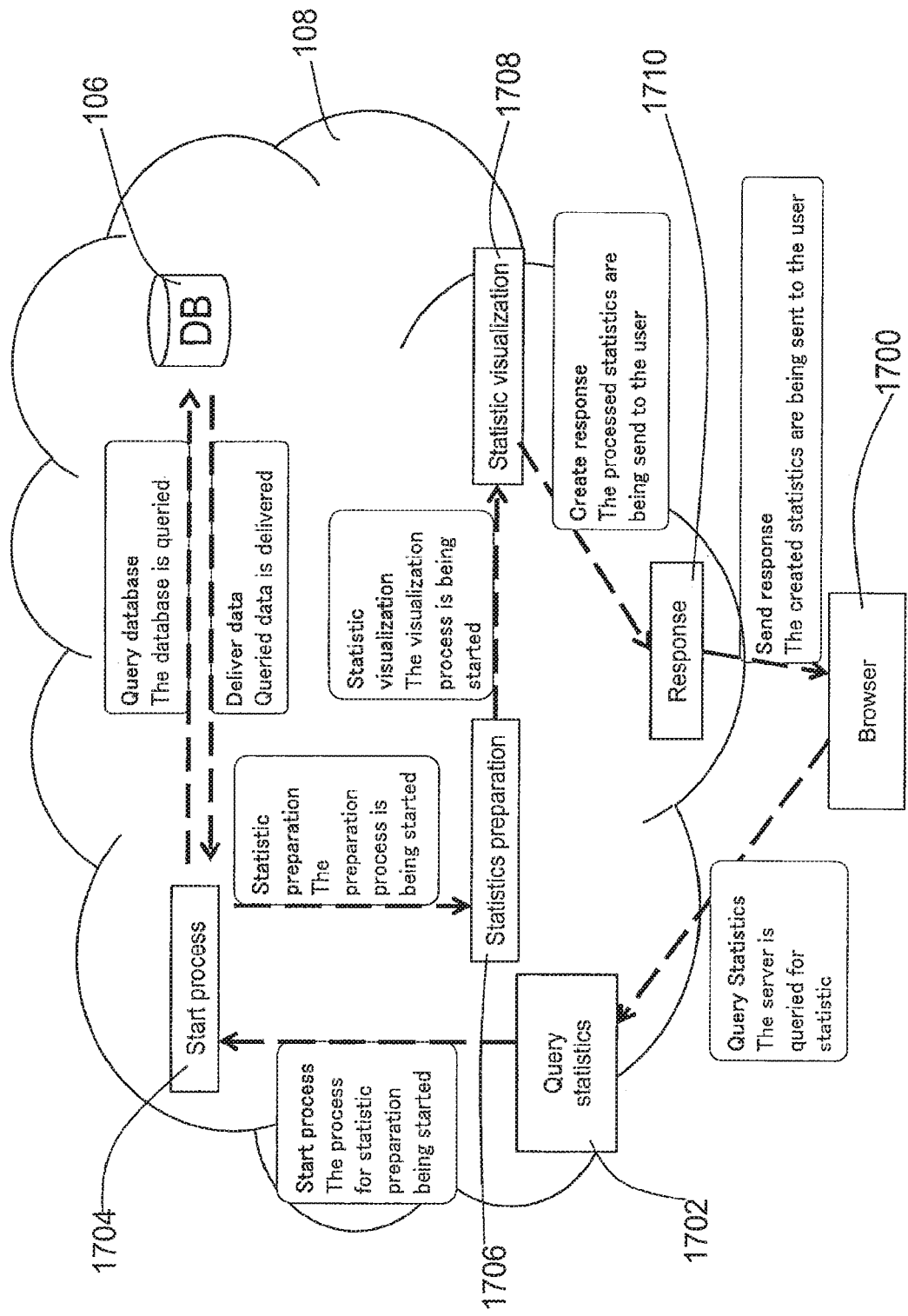
FIG. 17 illustrates the backend statistics query process.

FIG. 17 illustrates a backend statistics query process, initiated e.g. by a merchant (vendor) providing a bonus point collection program to his customers. The merchant (vendor) may be interested in obtaining figures informing him on the effectiveness of the bonus point collection program, on the customer acceptance and on other valuable information.

The vendor may use an internet terminal 1700, e.g. a personal computer, mobile computer, smart phone or the like for entering his request for statistical information and accessing the statistics. The server, e.g. server 104 or another server located in the cloud 108, may receive the request at 1702, and may start the process for determining the required statistics at 1704 e.g. by querying database 106 for specific statistics. The statistical information may then be determined at 1706 and prepared for visualization at 1708. After having finished the preparing for visualization process, the server may send a response including the statistical information prepared for visualization to the user (vendor) at 1710, e.g. for display at his internet terminal 1700.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A mobile device for use in a system for managing an account of a customer linked to a plurality of rewards accounts of the customer for respective different merchants, the mobile device comprising:
   a tag reader configured to receive, via near field communication, when being located in proximity of a tag element and when one of the merchants of the different merchants provides the mobile device with local access to the tag element based on a transaction between the customer and said one merchant, a data signal representing a value of the tag element and tag identification data identifying said one merchant that is associated with the tag element;
   a network interface configured to communicate with a server; and
   a processor configured to, using a single application running on the mobile device that is non-specific to said one merchant and instead associated with all of the different merchants:
   determine the value of the tag element and the tag identification data identifying the merchant that is associated with the tag element based on the data signal, the value of the tag element being a fixed value set in advance by said one merchant for each of a plurality of associated transactions, including said transaction between the customer and said one merchant, and
   communicate, via the network interface, to the server, the determined value together with the tag identification data identifying the merchant that is associated with the tag element and an identification of a customer using the mobile device, without a merchant device of the merchant, which is different from and external to the mobile device, communicating to the server, together, the value of the tag element, the tag identification data, and the identification of the customer using the mobile device,
   wherein the identification of the customer was created prior to the tag reader being located in proximity to the tag element.

2. The mobile device according to claim 1, wherein:
   the tag reader is further configured to communicate, when being located in proximity of a further mobile device, with the further mobile device to automatically transmit information regarding the merchant between the mobile device and the further mobile device.

3. The mobile device according to claim 1, wherein:
   the mobile device is configured to communicate wirelessly with the merchant device.

4. A logic device for a mobile device for use in a system for managing an account comprised of a plurality of bonus accounts uniquely associated a customer for respective different merchants, the logic device comprising:
   a tag reader configured to receive, via near field communication, when being located in proximity of a tag element and when one of the merchants of the different merchants provides the mobile device with local access to the tag element based on a transaction between the customer and said one merchant, a data signal representing a value of the tag element and tag identification data identifying said one merchant that is associated with the tag element;
   a network interface configured to communicate with a server; and
   a processor configured to, using a single application running on the mobile device that is non-specific to said one merchant and instead associated with all of the different merchants:
   determine the value of the tag element and the tag identification data identifying the merchant that is associated with the tag element based on the data signal, and
   communicate, via the network interface to the server, the determined value together with the tag identification data identifying the merchant that is associated with the tag element and an identification of a customer using the mobile device, without a merchant device of the merchant, which is different from and external to the mobile device, communicating to the server, together, the value of the tag element, the tag identification data, and the identification of the customer using the mobile device,
   wherein the identification of the customer was created prior to the tag reader being located in proximity to the tag element.

5. The logic device according to claim 4, wherein:
   the tag reader is further configured to communicate, when being located in proximity of a further logic device, with the further logic device to automatically transmit information regarding the merchant between the logic device and the further logic device.

6. The logic device according to claim 4, wherein:
   the logic device is configured to communicate wirelessly with the merchant device.

* * * * *